(12) United States Patent
Wolf et al.

(10) Patent No.: US 7,820,248 B2
(45) Date of Patent: Oct. 26, 2010

(54) COATING COMPOSITION COMPRISING HYDROXYLAMINE ESTERS

(75) Inventors: Jean-Pierre Wolf, Maisprach (CH); Ljubomir Misev, Breitenbach (CH); Peter Nesvadba, Marly (CH); Sevgi Zeren, Riehen (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 1232 days.

(21) Appl. No.: 10/545,755

(22) PCT Filed: Mar. 3, 2004

(86) PCT No.: PCT/EP2004/050241

§ 371 (c)(1),
(2), (4) Date: Aug. 15, 2005

(87) PCT Pub. No.: WO2004/081100

PCT Pub. Date: Sep. 23, 2004

(65) Prior Publication Data

US 2006/0172080 A1 Aug. 3, 2006

(30) Foreign Application Priority Data

Mar. 12, 2003 (EP) .................. 03405140

(51) Int. Cl.
*B05D 3/00* (2006.01)
*B29C 71/02* (2006.01)
(52) U.S. Cl. ...................... 427/532; 526/220
(58) Field of Classification Search ............. 427/532; 526/220
See application file for complete search history.

(56) References Cited

U.S. PATENT DOCUMENTS 6,900,268 B2 * 5/2005 Fink et al. .................... 525/69
2003/0199640 A1 * 10/2003 Coleridge et al. .......... 525/326.2

* cited by examiner

Primary Examiner—Robert D. Harlan
(74) Attorney, Agent, or Firm—Shiela A. Loggins

(57) ABSTRACT

The invention relates to a dual thermal and ultraviolet radiation curable coating composition, comprising a) at least an ethylenically unsaturated compound; b) a hydroxylamine ester effective to enable IR-curing or NIR-curing of the ethylenically unsaturated compound; c) a photoinitiator effective to enable UV-curing of the ethylenically unsaturated compound; wherein the thermal initiator is a hydroxylamine ester which has a structural element of formula (1) or formula (1) or a polymeric hydroxylamine ester which has a repetitive structural unit of formula (11) or (I[') of formula (11) Furthermore, the invention relates to a process for curing a thermal curable coating composition composing hydroxylamine esters as thermal initiators using NIR-curing.

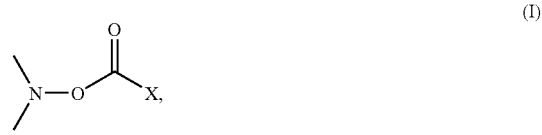

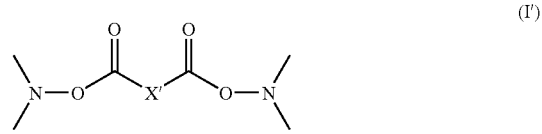

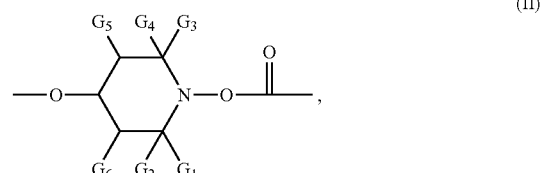

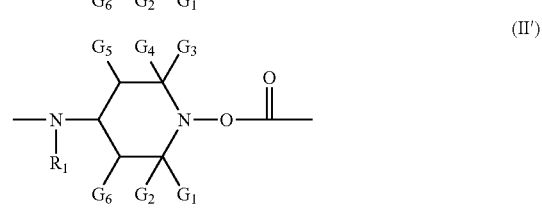

14 Claims, No Drawings

COATING COMPOSITION COMPRISING HYDROXYLAMINE ESTERS

The invention relates to a dual thermal and ultraviolet radiation curable coating composition comprising hydroxylamine esters as thermal initiators and photoinitiators as UV initiators and to a dual curing process using IR-curing or NIR-curing followed by UV curing. Furthermore, the invention relates to a process for curing a thermal curable coating composition comprising hydroxylamine esters as thermal initiators using NIR-curing.

The PCT Publication WO01/90113 describes hydroxylamine esters and polymerizable compositions comprising these hydroxylamine esters and an ethylenically unsaturated monomer or oligomer. The polymerization process may be effected in the presence of an energy intensive light source providing light in the near infrared range.

U.S. Pat. No. 5,922,473 discloses dual curing systems for coating compositions comprising an ethylenically unsaturated compounds, peroxides and/or azo thermal initiators and photoinitiators. Describes are pigmented powder coatings, that can be fully cured through.

The disadvantage of using peroxide initiators especially in powder coatings has been that they decrease the glass transition temperature. Thus problems of lumping or aggregate formation might occur.

Furthermore adhesion problems may occur in dual curing systems using peroxides as thermal initiators, It has now been found that lumping can be avoided using the above-mentioned hydroxylamine esters as thermal initiators in a dual curing process including a NIR curing step. In addition adhesion can be improved and reasonable through curing rates can be achieved, especially in pigmented systems.

Thus, the invention relates to a dual thermal and ultraviolet radiation curable coating composition, comprising
a) at least an ethylenically unsaturated compound;
b) a thermal initiator effective to enable IR-curing or NIR-curing of the ethylenically unsaturated compound;
c) a photoinitiator effective to enable UV-curing of the ethylenically unsaturated compound;

wherein the thermal initiator is a hydroxylamine ester which has a structural element of formula (I) or formula (I') or a polymeric hydroxylamine eater which has a repetitive structural unit of formula (II) or (II')

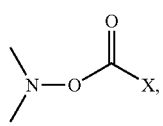
(I)

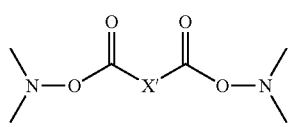
(I')

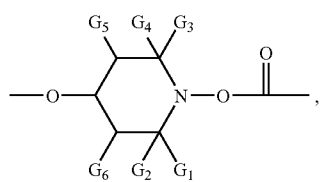
(II)

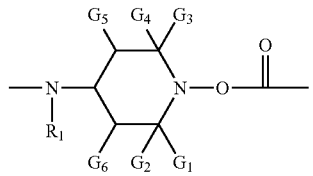
(II')

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_8$-$C_{10}$aryl, —N($C_1$-$C_6$alkyl)$_2$;

X' is a direct bond or $C_1$-$C_{36}$alkylen, $C_1$-$C_{36}$, $C_1$-$C_{36}$alkinylene, —($C_1$-$C_6$alkylene)phenyl-($C_1$-$C_6$alkylene) or a group

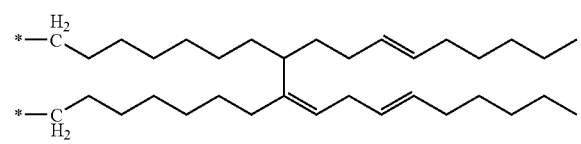

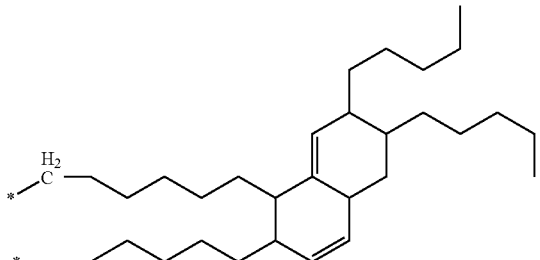

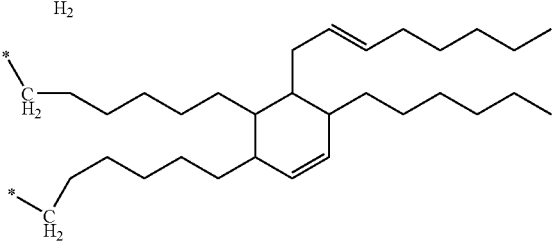

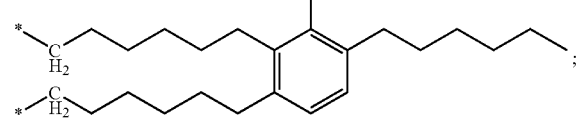

$G_1$, $G_2$, $G_3$ and $G_4$ are independently of one another $C_1$-$C_4$alkyl, or $G_1$ and $G_2$ together and $G_3$ and $G_4$ together, or $G_1$ and $G_2$ together or $G_3$ and $G_4$ together are pentamethylene;

$G_5$ and $G_6$ are independently of one another hydrogen or $C_1$-$C_4$ alkyl;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl.

Definitions:

Thermal Curing:
Thermal curing refers to the application of convection heat or IR- or NIR-radiation after the mixture has been applied to substrate. In case of powder coatings the adhered powder coating is first melted to form a surface layer preferably by convection heat.

NIR-Curing

The NIR radiation used in the process according to the invention is short-wave infrared radiation in the wavelength range from about 750 nm to about 1500 nm, preferably 750 nm to 1200 nm. Radiation sources for NIR radiation include, for example, conventional NIR radiation emitters, which are available commercially (for example, from Adphos).

IR-Curing

The IR radiation used in the process according to the invention is medium wave radiation in the wave length range from about 1500 nm to about 3000 nm and/or longer-wave infrared radiation in the wave length range above 3000 nm.

IR radiation emitters of this kind are available commercially (for example, from Heraeus).

UV-Curing

The photochemical curing step is carried out usually using light of wavelengths from about 200 nm to about 600 nm, especially from 200 to 450 nm. As light sources there are used a large number of the most varied types. Both point sources and planiform projectors (lamp carpets) are suitable. Examples are: carbon arc lamps, xenon arc lamps, medium-, high- and low-pressure mercury lamps, optionally doped with metal halides (metal halide lamps), microwave-excited metal-vapor lamps, excimer lamps, super actinic fluorescent tubes, fluorescent lamps, argon filament lamps, electronic flash lamps, photographic flood lights, electron beams and X-rays generated by means of synchrotrons or laser plasma.

In a preferred embodiment only NIR radiation is used in step b).

In a dual cure system the UV radiation may be followed by IR or NIR radiation or vice versa. Preferably the UV radiation follows the IR or NIR radiation. It is also possible that the UV radiation follows a convection heat exposure.

Inert Gas

The IR, NIR or UV curing may be carried out using radiation lamps in an inert atmosphere such as carbon dioxide, nitrogen, argon or xenon.

Definition of the Ethylenically Unsaturated Compound:

The general radical-polymerizable compound is selected from known radical-polymerizable compounds having at least one ethylenically unsaturated double bond. Included are monomers, prepolymers, oligomers, a mixture thereof or a copolymer thereof.

Non-limiting examples of such monomers include:

Unsaturated carboxylic acids such as (meth)acrylic acid, crotonic acid, itaconic acid (methylene succinic acid), maleic acid, or fumaric add and salts, esters and amides thereof. Also mentioned are unsaturated fatty acids such as linolenic acid and oleic acid. Acrylic and methacrylic add are preferred.

It is also possible, however, to use saturated di- or poly-carboxylic acids in admixture with unsaturated carboxylic acids. Examples of suitable saturated di- or poly-carboxylic acids include, for example, malonic add, succinic acid, glutaric acid, adipic acid, sebacic add, 1,4-cyclohexane dicarboxylic acid, tetrachlorophthalic acid, tetrabromophthalic acid, phthalic anhydride, tetrahydrophthalic acid, isophthalic acid, terephthalic acid, trimellitic acid, heptane-dicarboxylic acid, dodecanedicarboxylic acid, hexahydrophthalic acid, etc.

Esters of the above mentioned unsaturated acids are e.g. alkyl esters such as methyl, ethyl, 2-chloroethyl, N-dimethylaminoethyl, n-butyl, isobutyl-, pentyl, hexyl, cyclohexyl, 2-ethylhexyl, octyl, isobornyl[2-exobornyl]esters; or phenyl, benzyl or o-, m- and p-hydroxyphenyl esters; or hydroxy alkyl esters e.g. 2-hydroxyethyl, 2-hydroxypropyl, 4-hydroxybutyl, 3,4-dihydroxybutyl or glycerol[1,2,3-propanetriol]esters, or epoxy alkyl esters e.g. glycidyl, 2,3-epoxybutyl, 3,4-epoxybutyl, 2,3-epoxycyclohexyl, 10,11-epoxyundecyl esters, or amino alkyl or mercapto alkyl esters, or esters as described below.

Amides of the above mentioned unsaturated acids are e.g. (meth)acryl amides, N-substituted (meth)acryl amides, e.g. N-methylolacrylamide, N-methylolmethacrylamide, N-methylacrylamide, N-ethylmethacrylamide, N-hexylacrylamide, N-hexylmethacrylamide, N-cyclohexylacrylamide, N-cyclohexylmethacrylamide-, N-hydroxyethylacrylamide, N-phenylacrylamide, N-phenylmethacrylamide, N-benzylacrylamide, N-benzylmetacrylamide, N-nitrophenylacrylamide, N-nitrophenylmethacrylamide, N-ethyl-N-phenylacrylamide, N-ethyl-N-phenylmethacrylamide, N-(4-hydroxyphenyl)acrylamide, and N-(4-hydroxyphenyl)methacrylamide, IBMAA (N-isobutoxymethyl acrylamide, or amides with aliphatic polyvalent amines.

(Meth)acrylnitriles;

Unsaturated acid anhydrides such as itaconic anhydride, maleic anhydride, 2,3-dimethyl maleic anhydride, and 2-chloromaleic anhydride.

Styrenes, such as methyl styrene, chloromethyl styrene, and o-, m-, and p-hydroxystyrene. Vinyl ethers such as isobutyl vinyl ether, ethyl vinylether, 2-chloroethyl vinylether, hydroxyethyl vinylether, propyl vinylether, butyl vinylether, isobutyl vinyl ether, octyl vinylether and phenyl vinylether.

Vinyl esters such as vinyl acetate, vinyl chloroacetate, vinyl butyrate and vinyl benzoate. vinyl chloride and vinylidene chloride N-vinyl heterocyclic compounds, N-vinylpyrrolidone or suitably substituted vinylpyrrolidones, N-vinylcarbazol, 4-vinylpyridine, Further examples of esters are:

diacrylate esters such as 1,6-hexanediol diacrylate (HDDA), ethylene glycol diacrylate, propylene glycol diacrylate, tripropylene glycol diacrylate, neopentyl glycol diacrylate, hexamethylene glycol diacrylate and bisphenol A diacrylate, divinylbenzene, divinyl succinate, diallyl phthalate, triallyl phosphate, triallyl isocyanurate and tris(2-acryloylethyl)isocyanurate.

trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bis-methacrylates of polyethylene glycol having a molecular weight of from 200 to 1500, and mixtures thereof. The following esters are also suitable: dipropylene glycol diacrylate, tripropylene glycol diacrylate, glycerol ethoxylate triacrylate, glycerol propoxylate triacrylate, trimethylolpropane ethoxylate triacrylate, trimethylolpropane propoxylate triacrylate, pentaerythritol ethoxylate tetraacrylate, pentaerythritol propoxylate triacrylate, pentaerythritol propoxylate tetraacrylate, neopentyl glycol ethoxylate diacrylate, neopentyl glycol propoxylate diacrylate.

Non limiting examples of higher molecular weight (oligomeric) polyunsaturated compounds (also known as prepolymers) are esters of ethylenically unsaturated mono- or polyfunctional carboxylic acids as described above and polyols or polyepoxides, and polymers having ethylenically unsaturated groups in the chain or in side groups, e.g. unsaturated polyesters, polyamides and polyurethanes and copolymers thereof, alkyd resins; polybutadiene and butadiene copolymers, polyisoprene and isoprene copolymers, polymers and copolymers having (meth)acrylic groups in side chains such as methacrylated urethanes and also mixtures of one or more such polymers.

Suitable polyols are aromatic and, especially, aliphatic and cycloaliphatic polyols. Examples of aromatic polyols are benzyl alcohol, hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or fully esterified by one or by different unsaturated carboxylic acid(s), it being possible for the free hydroxy groups in partial esters to be modified, for example etherified, or esterified by other carboxylic acids.

Aminoacrylates

A second oligomer used in combination with a monomer is an acrylate which has been modified by reaction with primary or secondary amines, as described, for example, in U.S. Pat. No. 3,844,916 of Gaske, in EP 280 222 of Weiss et al., in U.S. Pat. No. 5,482,649 of Meixner et al. or in U.S. Pat. No. 5,734,002 of Reich et al. Such amine-modified acrylates are also termed aminoacrylates. Aminoacrylates are obtainable, for example, under the name EBECRYL 80, EBECRYL 81, EBECRYL 83, EBECRYL P115, EBECRYL 7100 from UCB Chemicals, under the name Laromer PO 83F, Laromer PO 84F, Laromer PO 94F from BASF, under the name PHOTOMER 4775 F, PHOTOMER 4987 F from Cognis or under the name CN501, CN503, CN550 from Cray Valley.

The unsaturated polymer can be used alone or in any desired mixtures.

Preferences of the Hydroxylamine Esters

Preferred is a process, wherein the hydroxylamine ester is of formula (Ia) or (I'a)

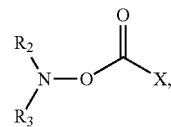

(Ia)

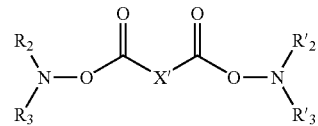

(I'a)

wherein

X and X' are as defined above, and $R_2$, $R_3$, $R_2'$ and $R_3'$ are independently of one another unsubstituted $C_1$-$C_{18}$alkyl, $C_2$-$C_{18}$alkenyl, $C_2$-$C_{18}$alkinyl; or $C_1$-$C_{18}$alkyl, $C_2$-$C_{18}$alkenyl, $C_2$-$C_{18}$alkinyl substituted by halogen, CN, $NO_2$ or —$COOR_4$ with $R_4$ being H, phenyl or $C_1$-$C_{18}$alkyl; and whereby the alkyl chain of $R_2$, $R_3$, $R_2'$ and $R_3'$ may be interrupted by a nitrogen or oxygen atom; or $R_2$ and $R_3$ and/or $R_2'$ and $R_3'$ together with the nitrogen atom to which they are attached form a 5 or 6 membered ring which may be interrupted by a nitrogen or oxygen atom and which may be substituted by one or more $C_1$-$C_6$alkyl groups, carboxyl groups, $C_1$-$C_{18}$alkoxy groups or $C_1$-$C_{18}$alkanoyloxy groups.

A 6-membered ring is generally preferred.

More preferred is a process wherein the structural element of formula (I) is of formulae A to S

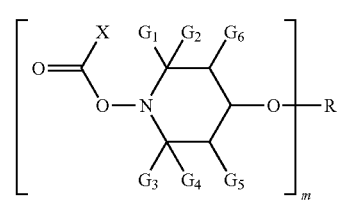

(A)

wherein X and $G_1$ to $G_6$ are as defined above;

R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3-$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

R, if m is 2, is $C_2$-$C_{12}$, $C_4$-$C_{12}$, xylylene, a divalent radical of an aliphatic dicarboxylic acid having 2 to 36 carbon atoms, of a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —$COOZ_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by —COOZ$_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid;

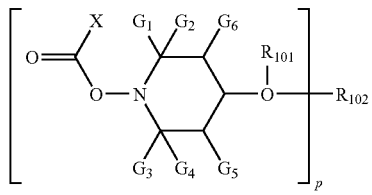
(B)

wherein X and G$_1$ to G$_6$ are as defined above;
p is 1, 2 or 3,
R$_{101}$ is C$_1$-C$_{12}$alkyl, C$_5$-C$_7$cycloalkyl, C$_7$-C$_8$aralkyl, C$_2$-C$_{18}$alkanoyl, C$_3$-C$_5$alkenoyl or benzoyl;
R$_{102}$, if p is 1, is C$_1$-C$_{18}$alkyl, C$_5$-C$_7$cycloalkyl, C$_2$-C$_8$alkenyl unsubstituted or substituted by a cyano, carbonyl or carbamide group, or is glycidyl, a group of the formula —CH$_2$CH(OH)—Z or of the formula —CO—Z— or —CONH—Z wherein Z is hydrogen, methyl or phenyl; or R$_{101}$ and R$_{102}$ together when p is 1 can be the cyclic acyl radical of an aliphatic or aromatic 1,2- or 1,3-dicarboxylic acid;
R$_{102}$, if p is 2, is C$_2$-C$_{12}$, C$_6$-C$_{12}$arylene, xylylene, a —CH$_2$CH(OH)CH$_2$—O—B—O—CH$_2$CH(OH)CH$_2$— group, wherein B is C$_2$-C$_{10}$, C$_6$-C$_{15}$arylene or C$_6$-C$_{12}$cyclo; or, provided that R$_{101}$ is not alkanoyl, alkenoyl or benzoyl, R$_{102}$ can also be a divalent acyl radical of an aliphatic, cycloaliphatic or aromatic dicarboxylic acid or dicarbamic acid, or can be the group —CO—;
R$_{102}$ is a group

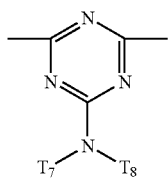

wherein T$_7$ and T$_8$ are independently hydrogen, C$_1$-C$_{18}$alkyl, or T$_7$ and T$_8$ together are C$_4$-C$_6$alkylene or 3-oxapentamethylene;
R$_{102}$, if p is 3, is 2,4,6-triazinyl;

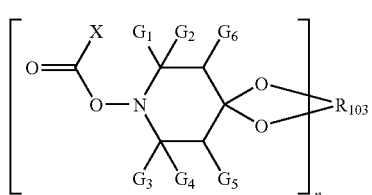
(C)

wherein X and G$_1$ to G$_6$ are as defined above;

R$_{103}$ if n is 1, is C$_2$-C$_8$- or hydroxy or C$_4$-C$_{32}$acyloxy; or
R$_{103}$ if n is 2, is (—CH$_2$)$_2$C(CH$_2$—)$_2$;

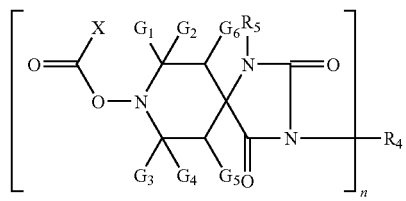
(D)

wherein X and G$_1$ to G$_6$ are as defined above;
R$_4$ if n is 1, is hydrogen, C$_1$-C$_{12}$alkyl, C$_3$-C$_5$alkenyl, C$_7$-C$_9$aralkyl, C$_5$-C$_7$cycloalkyl, C$_2$-C$_4$hydroxyalkyl, C$_2$-C$_6$alkoxyalkyl, C$_8$-C$_{10}$aryl, glycidyl, a group of formula —(CH$_2$)$_m$—COO-Q or of the formula —(CH$_2$)$_m$—O—CO-Q wherein m is 1 or 2 and Q is C$_1$-C$_4$alkyl or phenyl; or;
R$_4$ if n is 2, is C$_2$-C$_{12}$, C$_6$-C$_{12}$arylene, a group —CH$_2$CH(OH)CH$_2$—O-D-O—CH$_2$CH(OH)CH$_2$— wherein D is C$_2$-C$_{10}$, C$_6$-C$_{15}$arylene or C$_6$-C$_{12}$cyclo, or a group —CH$_2$CH(OZ$_1$)CH$_2$—(OCH$_2$CH(OZ$_1$)CH$_2$)$_2$— wherein Z$_1$ is hydrogen, C$_1$-C$_{18}$alkyl, allyl, benzyl, C$_2$-C$_{12}$alkanoyl or benzoyl;
R$_5$ is hydrogen, C$_1$-C$_{12}$alkyl, allyl, benzyl, glycidyl or C$_2$-C$_6$alkoxyalkyl;

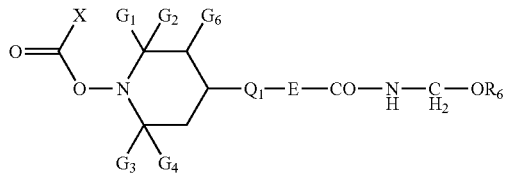
(E)

wherein X and G$_1$ to G$_6$ are as defined above;
Q$_1$ is —N(R$_7$)— or —O—; with R$_7$ being hydrogen or C$_1$-C$_{18}$alkyl;
E is C$_1$-C$_3$, the group —CH$_2$CH(R$_8$)—O— wherein R$_8$ is hydrogen, methyl or phenyl, the group —(CH$_2$)$_3$—NH— or a direct bond;
R$_6$ is C$_1$-C$_{18}$alkyl, C$_5$-C$_7$-cycloalkyl, C$_7$-C$_{12}$aralkyl, cyanoethyl, C$_8$-C$_{10}$-aryl, the group —CH$_2$CH(R$_8$)—OH; or a group of the formula

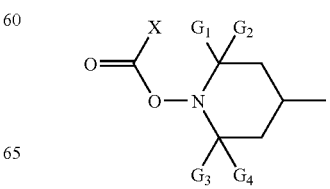

or a group of the formula

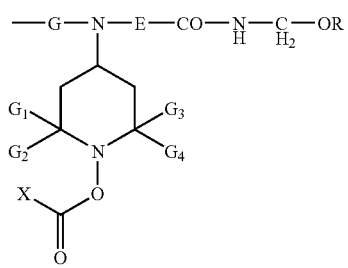

wherein G is $C_2$-$C_6$ or $C_6$-$C_{12}$arylene and R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, where each carbonic acid can be substituted in the aliphatic, cycloaliphatic or aromatic moiety by 1 to 3-$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

or $R_6$ is a group -E-CO—NH—$CH_2$—$OR_7$ with $R_7$ being hydrogen or $C_1$-$C_{18}$alkyl;

(F)

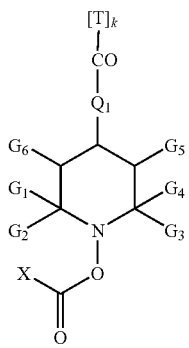

wherein X and $G_1$ to $G_6$ are as defined above;
k is 2 to 100;
T is ethylene or 1,2-propylene, or is a repeating structural unit derived from an α-olefin copolymer with an alkyl acrylate or methacrylate; and
$Q_1$ is $N(R_7)$— or —O—; with $R_7$ being hydrogen or $C_1$-$C_{18}$alkyl;

(G)

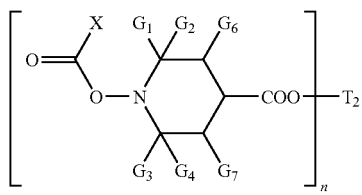

wherein X and $G_1$ to $G_6$ are as defined above;
$T_2$ if n is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl, a group of formula —$(CH_2)_m$—COO-Q or of the formula —$(CH_2)_m$—O—CO-Q wherein m is 1 or 2 and Q is $C_1$-$C_4$alkyl or phenyl; or;

$T_2$ if n is 2, is $C_2$-$C_{12}$, $C_6$-$C_{12}$arylene, a group —$CH_2CH(OH)CH_2$—O-D-O—$CH_2CH(OH)CH_2$— wherein D is $C_2$-$C_{10}$, $C_6$-$C_{15}$arylene or $C_6$-$C_{12}$cyclo, or a group —$CH_2CH(OZ_1)CH_2$—$(OCH_2CH(OZ_1)CH_2$— wherein $Z_1$ is hydrogen, $C_1$-$C_{18}$alkyl, allyl, benzyl, $C_2$-$C_{12}$alkanoyl or benzoyl;

(H)

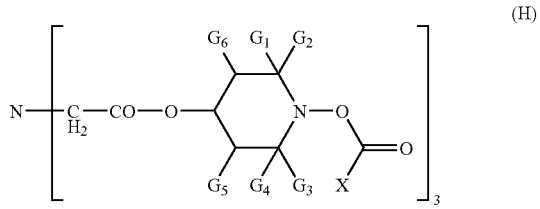

wherein X and $G_1$ to $G_6$ are as defined above;

(I)

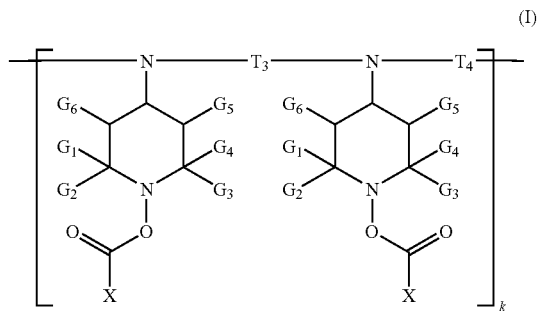

wherein X and $G_1$ to $G_6$ are as defined above;
k is 2 to 100;
$T_3$ and $T_4$ are independently of one another $C_2$-$C_{12}$alkylene, or $T_4$ is a group

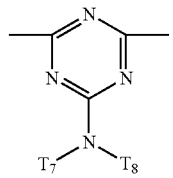

$T_7$ and $T_8$ are independently of one another hydrogen $C_1$-$C_{18}$alkyl, or $T_7$ and $T_8$ together are $C_4$-$C_8$ or 3-oxapenthamethylene;

(K)

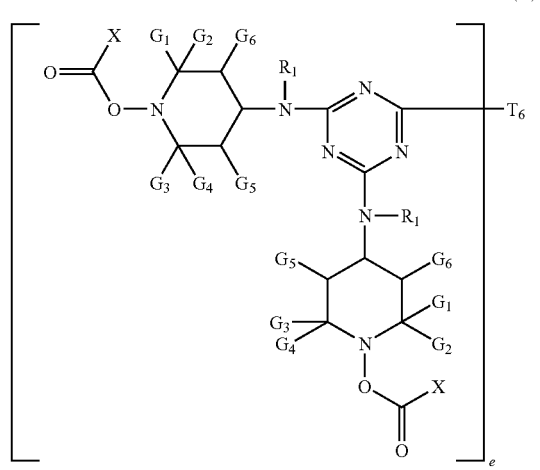

wherein $R_1$, X and $G_1$ to $G_6$ are as defined above;

e is 3 or 4;

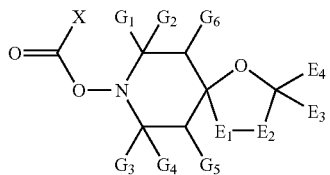

wherein a, b and c are independently 2 or 3, and d is 0 or 1;

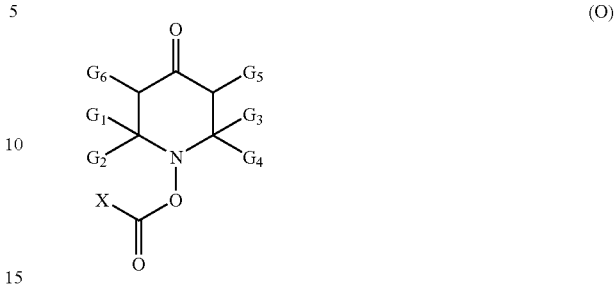 (L)

wherein X and $G_1$ to $G_6$ are as defined above;

$E_1$ and $E_2$, being different, each are —CO— or —N($E_5$)-, wherein $E_5$ is hydrogen, $C_1$-$C_{12}$alkyl or $C_4$-$C_{22}$ alkoxycarbonylalkyl;

$E_3$ and $E_4$ independently of one another are hydrogen, $C_1$-$C_{30}$alkyl, unsubstituted phenyl or naphthyl; or phenyl or naphthyl substituted by chlorine or by $C_1$-$C_4$alkyl;

$E_3$ and $E_4$ together are polymethylene of 4 to 17 carbon atoms, optionally substituted by up to four $C_1$-$C_4$alkyl groups;

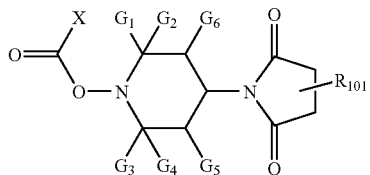 (M)

wherein X and $G_1$ to $G_6$ are as defined above and $R_{101}$ is as defined in formula B;

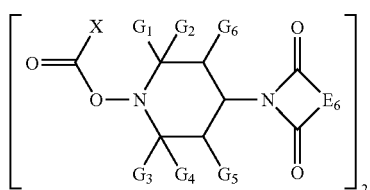 (N)

wherein X, and $G_1$ to $G_6$ are as defined above;

$E_6$ is an aliphatic or aromatic tetravalent radical;

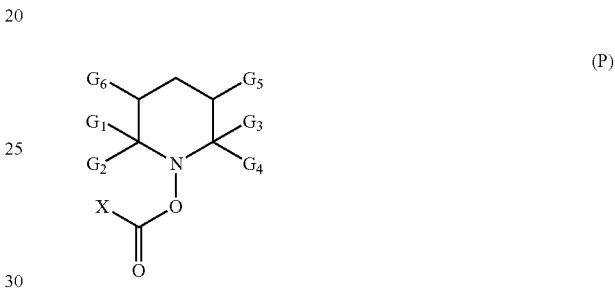 (O)

wherein X and $G_1$ to $G_6$ are as defined above;

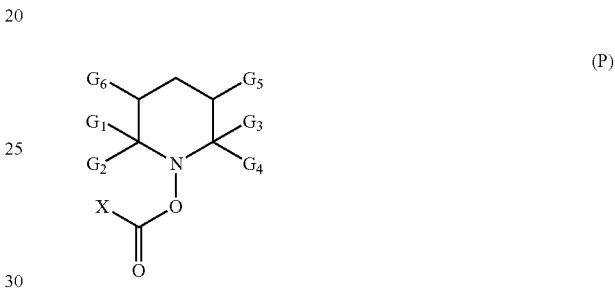 (P)

wherein X and $G_1$ to $G_6$ are as defined above;

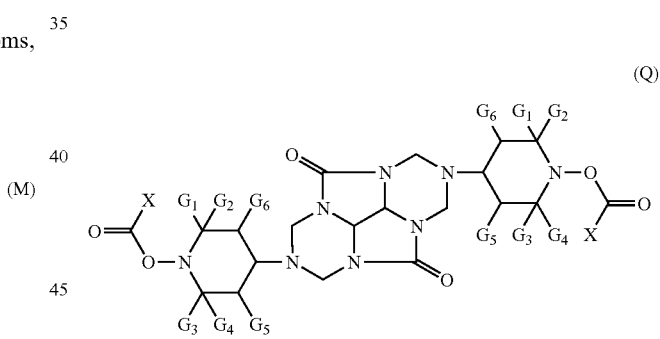 (Q)

wherein X and $G_1$ to $G_6$ are as defined above;

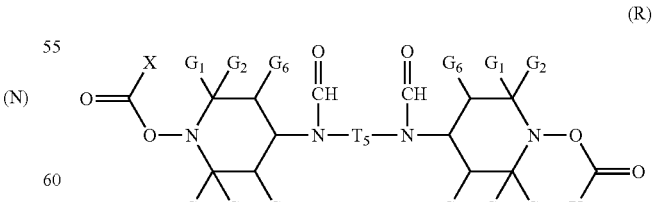 (R)

wherein X and $G_1$ to $G_6$ are as defined above;

$T_5$ is $C_2$-$C_{22}$, $C_5$-$C_7$cyclo, $C_1$-$C_4$di($C_5$-$C_7$cyclo), phenylene or phenylenedi($C_1$-$C_4$);

(S)

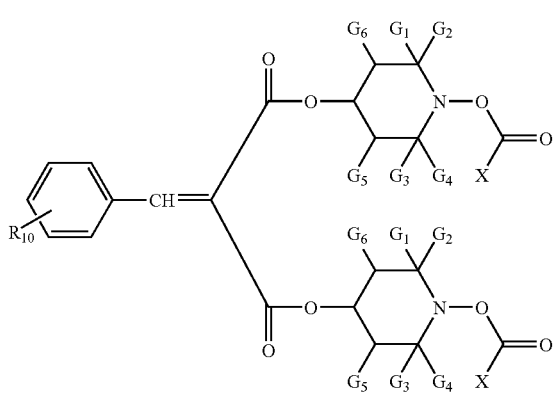

wherein X and $G_1$ to $G_6$ are as defined above;

$R_{10}$ is hydrogen, $C_1$-$C_{12}$alkyl or $C_1$-$C_{12}$alkoxy.

A preferred subgroup of hydroxylamine esters is of formula A, B or C and the substiutents are as defined above.

From these subgroup particularly preferred hydroxylamine esters are of formula A', B' or C'

(A')

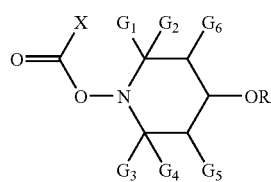

wherein
X is hydrogen, $C_1$-$C_{38}$alkyl or $C_6$-$C_{10}$aryl;
$G_1$, $G_2$, $G_3$ and $G_4$ are methyl or $G_1$ and $G_3$ are methyl and $G_2$ and $G_4$ are ethyl or $G_1$ and $G_2$ are methyl and $G_3$ and $G_4$ are ethyl;
$G_5$ and $G_6$ are independently hydrogen or methyl;
R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, wherein each carboxylic acid can be substituted in the aliphatic, cycloaliphatic or aromatic moiety by 1 to 3-$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or
R is a monovalent radical of a carbamic acid or phosphorus-containing acid or a monovalent silyl radical;

(B')

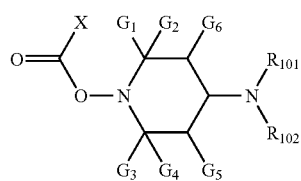

wherein X and $G_1$ to $G_6$ are as defined above;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, a carbonyl or a carbamide group, or is glycidyl, a group of the formula —$CH_2CH(OH)$—Z or of the formula —CO—Z— or —CONH—Z wherein Z is hydrogen, methyl or phenyl;

(C')

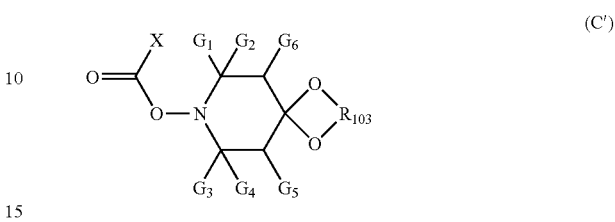

$R_{103}$ is $C_2$-$C_8$ or hydroxy or $C_4$-$C_{32}$acyloxy.

Hydroxylamine esters of formula A' are especially preferred.

In another embodiment of the inventive process the hydroxylamineester is a oligomer or polymer obtainable by reacting a dicarboxylic acid or a dicarboxylic acid derivative with a compound of formula A1 or B1 or by reacting a diisocyanate with a compound of formula A1

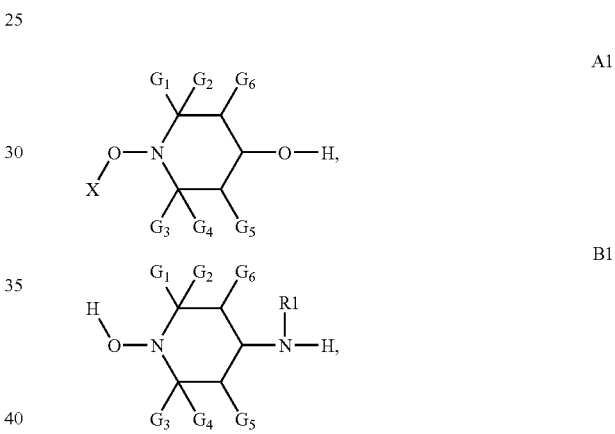

wherein the substituents $G_1$, $G_2$, $G_3$, $G_4$, $G_5$, $G_6$ and $R_1$ are as defined above.

Definition of the Radicals $C_3$-$C_{12}$alkenyl is for example propenyl, butenyl, pentenyl, hexenyl, heptenyl, octenyl, dodecenyl including their isomers.

$C_7$-$C_9$aralkyl is for example benzyl, phenylpropyl, α,α-dimethylbenzyl or α-methylbenzyl.

$C_2$-$C_{18}$alkyl interrupted by at least one O atom is for example —$CH_2$—$CH_2$—O—$CH_2$—$CH_3$, —$CH_2$—$CH_2$—O—$CH_3$ or —$CH_2$—$CH_2$—O—$CH_2$—$CH_2$—$CH_2$—O—$CH_2$—$CH_3$. It is preferably derived from polyethlene glycol. A general description is —$((CH_2)_a$—$O)_b$—H/$CH_3$, wherein a is a number from 1 to 6 and b is a number from 2 to 10.

If R is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If R is a monovalent silyl radical, it is, for example, a radical of the formula —$C_jH_{2j}$—Si(Z')$_2$Z", in which j is an integer in the range from 2 to 5, and Z' and Z", independently of one another, are $C_1$-$C_4$alkyl or $C_1$-$C_4$alkoxy.

If R is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl 4-hydroxybenzyl) malonyl or bicycloheptenedicarbonyl radical or a group of the formula

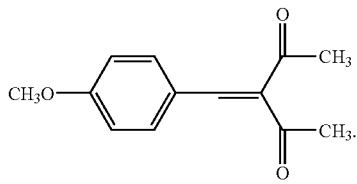

If R is a trivalent radical of a tricarboxylic acid, it is, for example, a trimellitoyl, citryl or nitrilotriacetyl radical.

If R is a tetravalent radical of a tetracarboxylic acid, it is, for example, the tetravalent radical of butane-1,2,3,4-tetracarboxylic acid or of pyromellitic acid.

If R is a divalent radical of a dicarbamic acid, it is, for example, hexamethylenedicarbamoyl or 2,4-toluylenedicarbamoyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

Any $C_2$-$C_{12}$ radicals are, for example, ethylene, propylene, 2,2-dimethylpropylene, tetramethylene, hexamethylene, octamethylene, decamethylene or dodecamethylene.

Any $C_6$-$C_{15}$ arylene substituents are, for example, o-, m- or p-phenylene, 1,4-naphthylene or 4,4'-diphenylene.

$C_6$-$C_{12}$cyclo is, in particular, cyclohexylene.

Hydroxyl-, cyano-, alkoxycarbonyl- or carbamide-substituted $C_1$-$C_4$alkyl can be, for example, 2-hydroxyethyl, 2-hydroxypropyl, 2-cyanoethyl, methoxycarbonylmethyl, 2-ethoxycarbonyl ethyl, 2-aminocarbonylpropyl or 2-dimethylaminocarbonyl)ethyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Suitable $C_1$-$C_{32}$acyloxy radicals are for example shown in formulae 143, 145, 146 and 159 of Table A.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene, trichloroethylidene.

Examples of unsubstituted or substituted are methylene, ethylene, phenylmethylene, diphenylmethylene, methylphenylmethylene. Examples of cycloalkylidene are cyclopentylidene, cyclohexylidene, cycloheptylidene and cyclooctylidene.

Specific useful single compounds are summarized in Table A.

TABLE A

| No. | Formula |
|---|---|
| 101 | |
| 102 | |
| 103 | |

TABLE A-continued

| No. | Formula |
|---|---|
| 104 | |
| 105 | |
| 106 | |
| 107 | |
| 108 | |
| 109 | |
| 110 | |

TABLE A-continued

| No. | Formula |
|-----|---------|
| 111 | |
| 112 | |
| 113 | |
| 114 | |
| 115 | |

TABLE A-continued
| No. | Formula |
|---|---|
| 116 | 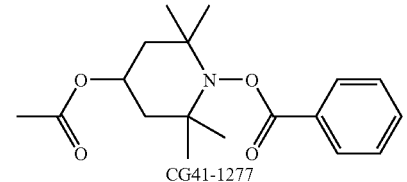 CG41-1277 |
| 117 | 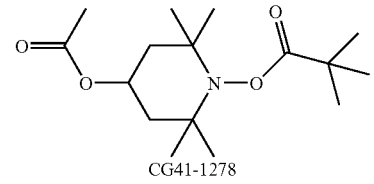 CG41-1278 |
| 118 | 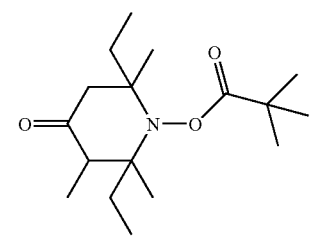 CG41-1276 |
| 119 | 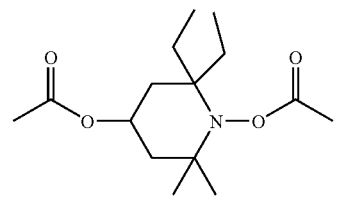 |
| 120 | 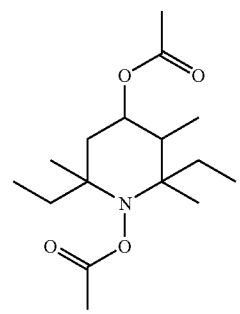 |
| 121 | 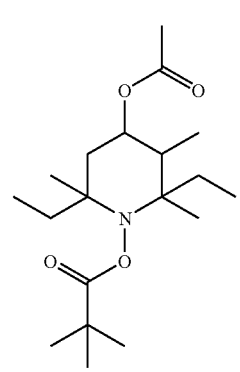 |

TABLE A-continued

| No. | Formula |
|---|---|
| 122 | |
| 123 | |
| 124 | |
| 125 | |
| 126 | |
| 127 | | ns

TABLE A-continued

| No. | Formula |
|-----|---------|
| 128 | |
| 129 | |
| 130 | |
| 131 | |
| 132 | |
| 133 | |

TABLE A-continued
| No. | Formula |
|---|---|
| 134 | 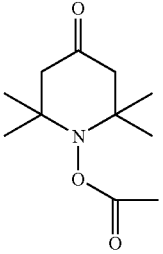 |
| 139 | 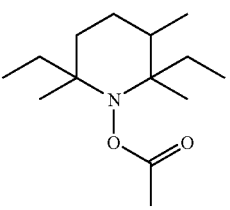 |
| 140 | 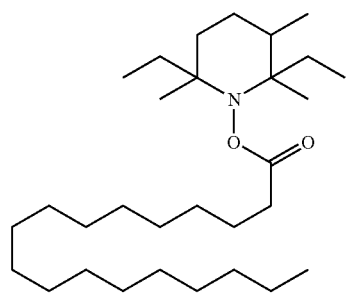 |
| 141 | 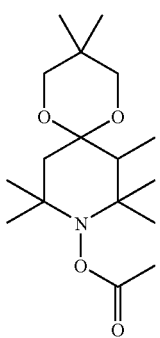 |
| 142 | 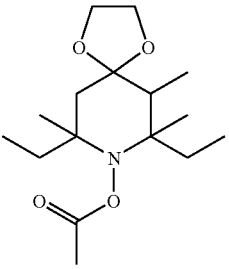 |

TABLE A-continued

| No. | Formula |
|-----|---------|
| 143 | |
| 144 | |
| 145 | |
| 146 | |

TABLE A-continued
| No. | Formula |
|---|---|
| 149 | 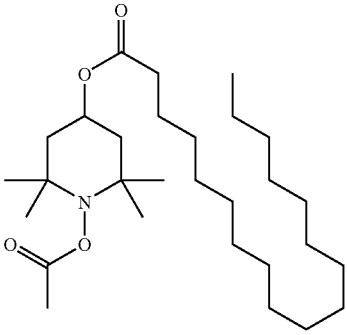 |
| 150 | 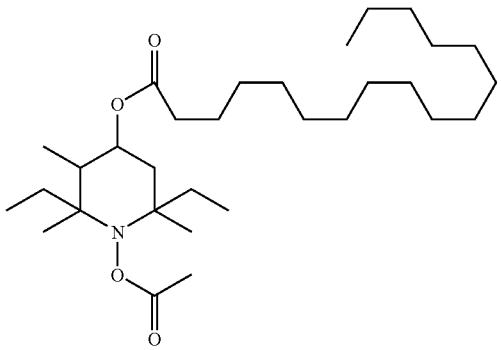 |
| 151 | 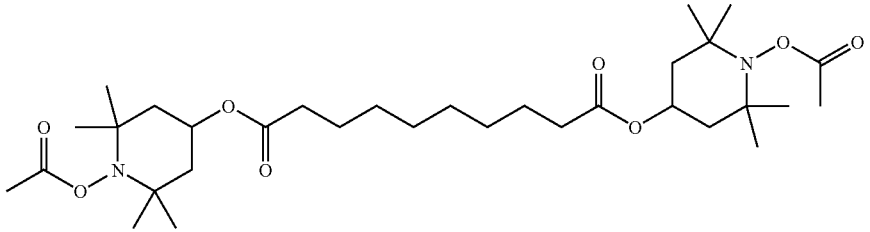 |
| 152 | 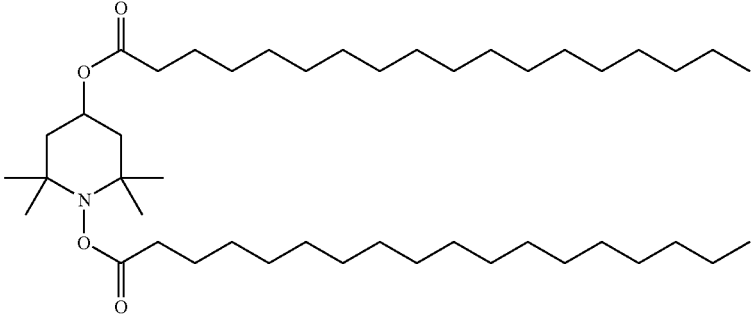 |
| 153 | 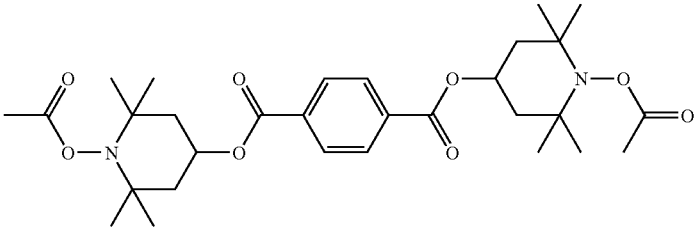 |

TABLE A-continued

| No. | Formula |
| --- | --- |
| 154 | |
| 155 | |
| 156 | |
| 157 | |
| 158 | |

TABLE A-continued

| No. | Formula |
|---|---|
| 159 | |
| 160 | CG41-1275 |

The preparation of the instant hydroxylamine precursors are for example disclosed in following U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

The hydroxylamines are reacted with a suitable acid derivative to form the final hydroxylamine esters. Such esterification processes are known and described in the chemical literature.

The preparation of particularly suitable compounds is described in WO 01/90113. (22203)

Preferably the hydroxylamine ester is present in an amount of from 0.01 to 10 weight-%, more preferably between 0.1 to 6 weight-% based on the weight of the unsaturated polymer (s) and monomer(s).

Additional Thermal Initiators:

Any thermal initiator known in the art may be used in addition to the hydroxylamine esters Preferably, the additional thermal initiators are peroxides such as dicumylperoxide and azo initiators as disclosed in U.S. Pat. No. 5,922,473.

Photoinitiators

In dual cure systems a photoinitiator is needed in addition to the thermal radical initiator.

Examples are:

Benzphenones of the formula

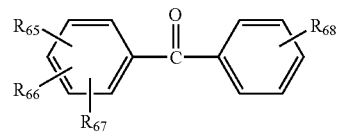

wherein $R_{65}$, $R_{66}$ and $R_{67}$ independently of one another are hydrogen, $C_1$-$C_4$-alkyl, $C_1$-$C_4$-halogenalkyl, $C_1$-$C_4$-alkoxy, chlorine or $N(C_1$-$C_4$-alkyl$)_2$;

$R_{68}$ is hydrogen, $C_1$-$C_4$-alkyl, $C_1$-$C_4$-halogenalkyl, phenyl, $N(C_1$-$C_4$-alkyl$)_2$, $COOCH_3$,

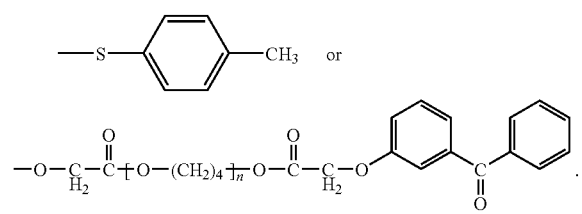

with n being 2-10.

Examples are:

ESACURE TZT® available from Lamberti, (a mixture of 2,4,6-trimethylbenzophenone and 4-methylbenzophenone).

Benzophenone, Darocur® BP

Alpha-hydroxyketones, alpha-alkoxyketones or alpha-aminoketones of the formula

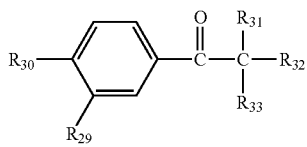

wherein
$R_{29}$ is hydrogen or $C_1$-$C_{18}$-alkoxy;
$R_{30}$ is hydrogen, $C_1$-$C_{18}$-alkyl, $C_1$-$C_{18}$-alkoxy, —OCH$_2$CH$_2$—OR$_{47}$, morpholino, SCH$_3$, a group—

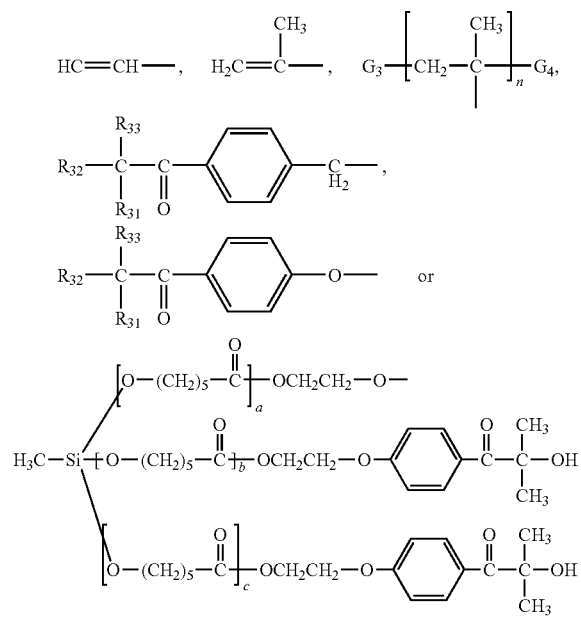

a, b and c are 1-3;
n is 2-10;
$G_3$ and $G_4$ independently of one another are end groups of the polymeric structure, preferably hydrogen or methyl;
$R_{47}$ is hydrogen,

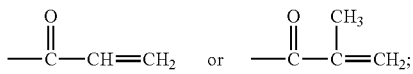

$R_{31}$ is hydroxy, $C_1$-$C_{16}$-alkoxy, morpholino, dimethylamino or —O(CH$_2$CH$_2$O)$_m$—C$_1$-C$_{18}$-alkyl;
$R_{32}$ and $R_{33}$ independently of one another are hydrogen, $C_1$-$C_8$alkyl, $C_1$-$C_{16}$-alkoxy or —O(CH$_2$CH$_2$O)$_m$—C$_1$-C$_{16}$-alkyl; or unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring; m is 1-20;

with the proviso that $R_{31}$, $R_{32}$ and $R_{33}$ not all together are $C_1$-$C_{16}$-alkoxy or —O(CH$_2$CH$_2$O)$_m$—C$_1$-C$_{16}$-alkyl.

Examples are:
1-Hydroxy-cyclohexyl-phenyl-ketone (IRGACURE®184) or IRGACUR® 500 (a mixture of IRGACURE®184 with benzophenone);
2-Methyl-1[4-(methylthio)phenyl]-2-morpholinopropan-1-one; (IRGACURE®907)
2-Benzyl-2-dimethylamino-1-(4-morpholinophenyl)-butanone-1; (IRGACURE®369)
1-[4-(2-Hydroxyethoxy)-phenyl]-2-hydroxy-2-methyl-1-propan-1-one; (IRGACURE®2959)
2,2-Dimethoxy-1,2-diphenylethan-1-one (IRGACURE®651)
2-Hydroxy-2-methyl-1-phenyl-propan-1-one; (DAROCUR® 1173)
2-Dimethylamino-2-(4-methyl-benzyl)-1-(4-morpholin-4-yl-phenyl)-butan-1-one;
2-Benzyl-1-(3,4-dimethoxy-phenyl)-2-dimethylamino-butan-1-one;
2-Hydroxy-1-{4-[4-(2-hydroxy-2-methyl-propionyl)-benzyl]-phenyl}-2-methyl-propan-1-one;
2-Hydroxy-1-{4-[4-(2-hydroxy-2-methyl-propionyl)-phenoxy]-phenyl}-2-methyl-propan-1-one.

Another example of an alpha-hydroxy ketone is a compound of the formula

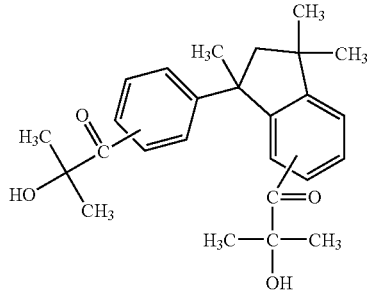

for example ESACURE KIP from Fratelli Lamberti, 2-hydroxy-1-{1-[4-(2-hydroxy-2-methyl-propionyl)-phenyl]-1,3,3-trimethyl-indanyl-5-yl}-2-methyl-propan-1-one.

Irgacure and Darocur products are available from Ciba Specialty Chemicals Inc.

Acylphosphine oxides of the formula

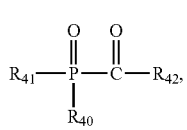

(V)

wherein
$R_{40}$ and $R_{41}$ independently of one another are unsubstituted $C_1$-$C_{20}$-alkyl, cyclohexyl, cyclopentyl, phenyl, naphthyl or biphenylyl; or $C_1$-$C_{20}$-alkyl, cyclohexyl, cyclopentyl, phenyl, naphthyl or biphenylyl substituted by halogen, $C_1$-$C_{12}$-alkyl, $C_1$-$C_{12}$-alkoxy, $C_1$-$C_{12}$alkylthio or NR$_{52}$R$_{53}$, or $R_{40}$ and $R_{41}$ are independently of one another —(CO)R$_{42}$;
wherein
$R_{52}$ and $R_{53}$ independently of one another are hydrogen, unsubstituted $C_1$-$C_{12}$-alkyl or $C_1$-$C_{12}$-alkyl substituted by OH or SH wherein the alkyl chain may be interrupted by one to four oxygen atoms; or $R_{52}$ and $R_{53}$ independently of one another are $C_2$-$C_{12}$-alkenyl, cyclopentyl, cyclohexyl, benzyl or phenyl;

$R_{42}$ is unsubstituted cyclohexyl, cyclopentyl, phenyl, naphthyl or biphenylyl, or cyclohexyl, cyclopentyl, phenyl, naphthyl or biphenylyl substituted by halogen, $C_1$-$C_4$-alkyl and/or $C_1$-$C_4$-alkoxy; or $R_{42}$ is a 5- or 6-membered heterocyclic ring having an S atom or N atom;

Examples are:

bis(2,4,6-trimethylbenzoyl)phenylphosphine oxide; IRGACURE®819

2,4,6-trimethylbenzoyl-diphenyl-phosphine oxide; Darocur® TPO bis(2,6-dimethoxybenzoyl)-2,4,4-trimethylpentylphosphine oxide. CGI 403

Titanocenes of the formula

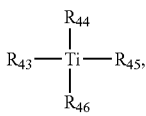

(VI)

$R_{43}$ and $R_{44}$ independently of one another are cyclopentadienyl optionally mono-, di-, or tri-substituted by $C_1$-$C_{18}$-alkyl, $C_1$-$C_{18}$-alkoxy, cyclopentyl, cyclohexyl or halogen;

$R_{45}$ and $R_{46}$ are phenyl having at least one F or $CF_3$ substituent in ortho position to the Ti—C bond and having at least a further substituent which is unsubstituted pyrrolinyl or polyoxaalkyl or which is pyrrolinyl or polyoxaalkyl substituted by one or two $C_1$-$C_{12}$-alkyl, di($C_1$-$C_{12}$-alkyl)aminomethyl, morpholinomethyl, $C_2$-$C_4$-alkenyl, methoxymethyl, ethoxymethyl, trimethylsilyl, formyl, methoxy or phenyl; or $R_{45}$ and $R_{46}$ are

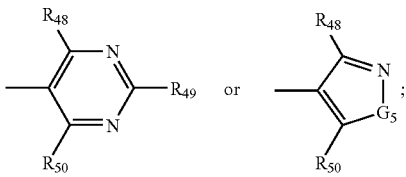

wherein $G_5$ is O, S, or $NR_{51}$ with $R_{51}$ being $C_1$-$C_8$alkyl, phenyl or cyclophenyl;

$R_{48}$, $R_{49}$ and $R_{50}$ independently of one another are hydrogen, halogen, $C_2$-$C_{12}$alkenyl, $C_1$-$C_{12}$alkoxy, $C_2$-$C_{12}$-alkoxy interrupted by one to four oxygen atoms, cyclohexyloxy, cyclopentyloxy, phenoxy, benzyloxy, unsubstituted phenyl or biphenyl or phenyl or biphenyl substituted by $C_1$-$C_4$-alkoxy, halogen, phenylthio or $C_1$-$C_4$-alkylthio, with the proviso that $R_{48}$ and $R_{50}$ are not both hydrogen and that with respect to the residue

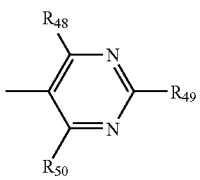

at least one substituent $R_{48}$ or $R_{50}$ is $C_1$-$C_{12}$alkoxy or $C_1$-$C_{12}$alkoxy interrupted by one to four oxygen atoms, cyclohexyloxy, cyclopentyloxy, phenoxy or benzyloxy.

Examples are:

Bis(.eta.5-2,4-cyclopentadien-1-yl)-bis(2,6-difluoro-3-(1H-pyrrol-1-yl)-phenyl)-titanium IRGACURE® 784

Bis(2,6-difluorophenyl)bis[1,2,3,4,5-eta)-1-methyl-2,4-cyclopentadien-1-yl]-titanium IRGACURE® 727

Phenylglyoxalates of the formula

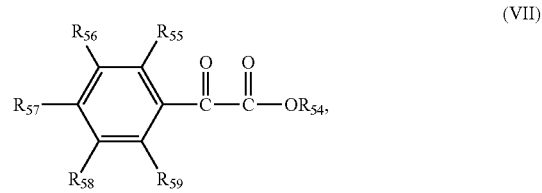

(VII)

$R_{54}$ is hydrogen, $C_1$-$C_{12}$-alkyl or a group

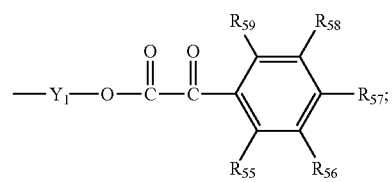

$R_{55}$, $R_{56}$, $R_{57}$, $R_{58}$ and $R_{59}$ independently of one another are hydrogen, unsubstituted $C_1$-$C_{12}$-alkyl or $C_1$-$C_{12}$-alkyl substituted by OH, $C_1$-$C_4$-alkoxy, phenyl, naphthyl, halogen or CN; and wherein the alkyl chain may be interrupted by one or more oxygen atoms; or $R_{65}$, $R_{56}$, $R_{57}$, $R_{58}$ and $R_{59}$ independently of one another are $C_1$-$C_4$-alkoxy, $C_1$-$C_4$alkylthio or $NR_{52}R_{53}$;

$R_{52}$ and $R_{53}$ independently of one another are hydrogen, unsubstituted $C_1$-$C_4$-alkyl or $C_1$-$C_{12}$-alkyl substituted by OH or SH wherein the alkyl chain may be interrupted by one to four oxygen atoms; or $R_{52}$ and $R_{53}$ independently of one another are $C_2$-$C_{12}$-alkenyl, cyclopentyl, cyclohexyl, benzyl or phenyl.

$Y_1$ is $C_1$-$C_{12}$-alkylene optionally interrupted by one or more oxygen atoms.

An example is oxo-phenyl-acetic acid 2-[2-(2-oxo-2-phenyl-acetoxy)-ethoxy]-ethyl ester.

Surface-Active Photoinitiators

Surface-active benzophenones as described in WO 02/48204 of the formula

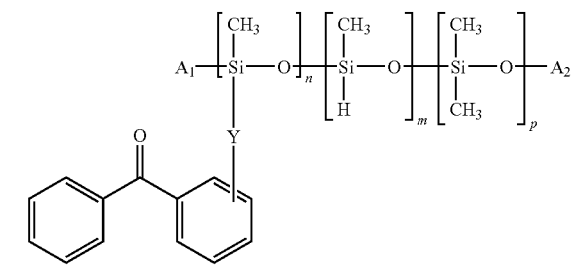

$A_1$ is methyl or —O—Si($CH_3$)$_3$ $A_2$ is methyl or —Si($CH_3$)$_3$;

Y is —($CH_2$)$_a$—, —($CH_2$)$_a$—O—, —($CH_2$)$_b$—O—($CH_2$)$_a$— or —($CH_2$)$_b$—O—($CH_2$)$_a$—O—;

a and b are independently of one another 1-10;

n is a number from 1 to 10;

m is a number from 0 to 25;

p is a number from 0 to 25.

An example is

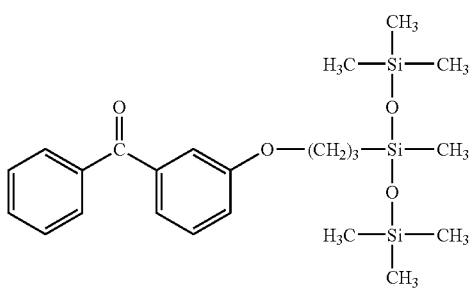

Siloxane-modified hydroxyketones as described in EP 1072326

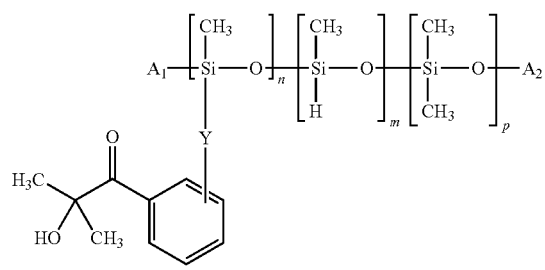

$A_1$ is methyl or —O—Si(CH$_3$)$_3$;
$A_2$ is methyl or —Si(CH$_3$)$_3$;
Y is —(CH$_2$)$_a$—, —(CH$_2$)$_a$—O—, —(CH$_2$)$_b$—O—(CH$_2$)$_a$— or —(CH$_2$)$_b$—O—(CH$_2$)$_a$—O—;
a and b are independently of one another 1-10;
n is a number from 1 to 10;
m is a number from 0 to 25;
p is a number from 0 to 25.
An example is

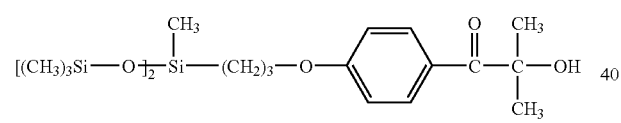

Surface-active benzil dialkyl ketals (BDK) or benzoins as described in WO 02/48203

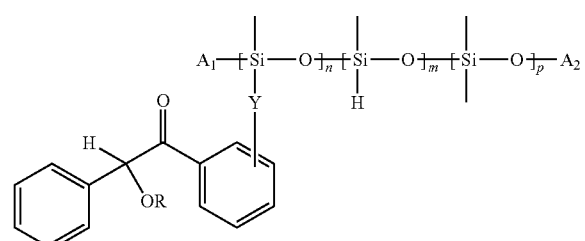

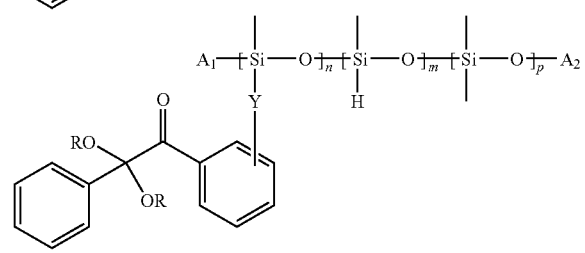

R is H or C$_1$-C$_4$alkyl;
$A_1$ is methyl or —O—Si(CH$_3$)$_3$
$A_2$ is methyl or —Si(CH$_3$);
Y is —(CH$_2$)$_a$—, —(CH$_2$)$_a$—O—, —(CH$_2$)$_b$—O—(CH$_2$)$_a$— or —(CH$_2$)$_b$—O—(CH$_2$)$_a$—O—;
a and b are independently of one another 1-10;
n is a number from 1 to 10;
m is a number from 0 to 25;
p is a number from 0 to 25.
Examples are

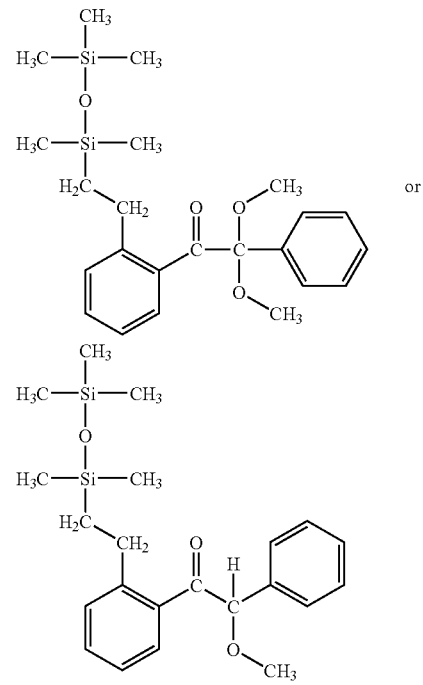

Monomeric and dimeric arylglyoxalic acid esters modified with siloxane via an ester group as described in WO 02/14439

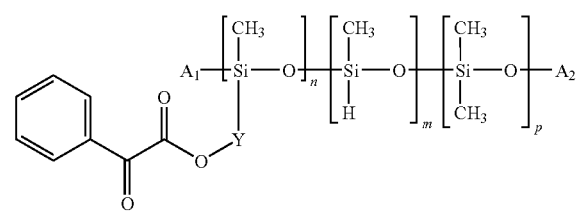

$A_1$ is methyl or —O—Si(CH$_3$)$_3$
$A_2$ is methyl or —Si(CH$_3$)$_3$;
Y is —(CH$_2$)$_a$—, —(CH$_2$)$_a$—O—, —(CH$_2$)$_b$—O—(CH$_2$)$_a$— or —(CH$_2$)$_b$—O—(CH$_2$)$_a$—O—;
a and b are independently of one another 1-10;
n is a number from 1 to 10;
m, p independently are a number from 0 to 25.
An example is

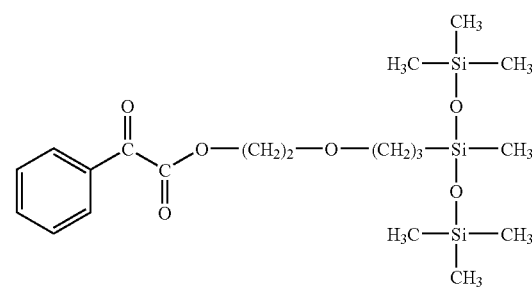

Monomeric and dimeric arylglyoxalic acid esters modified with siloxane via an aromatic group as described in WO 02/14326

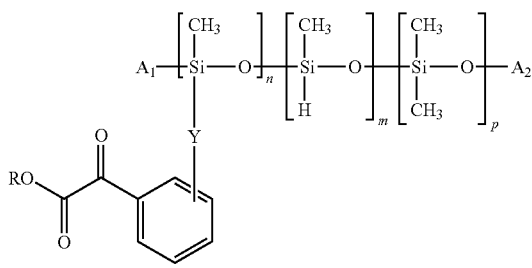

R is $C_1$-$C_4$alkyl;
$A_1$ is methyl or —O—Si(CH$_3$)$_3$
$A_2$ is methyl or —Si(CH$_3$);
Y is —(CH$_2$)$_a$—, —(CH$_2$)$_a$—O—, —(CH$_2$)$_b$—O—(CH$_2$)$_a$— or —(CH$_2$)$_b$—O—(CH$_2$)$_a$—O—;
a and b are independently of one another 1-10;
n is a number from 1 to 10;
m is a number from 0 to 25;
p is a number from 0 to 25.
An example is

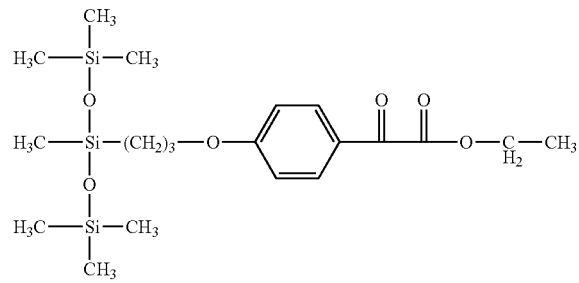

Long-chain-alkyl-modified hydroxyketones as described in WO 02/48202, for example 1-(4-docosyloxy-phenyl)-2-hydroxy-2-methyl-1-propanone

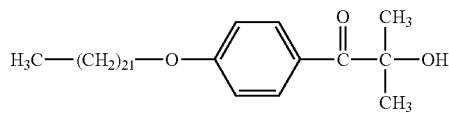

A further example of a photoinitiator is Esacure 1001 available from Lamberti: 1-[4-(4-benzoylphenylsulfanyl)phenyl]-2-methyl-2-(4-methylphenylsulfonyl)propan-1-one

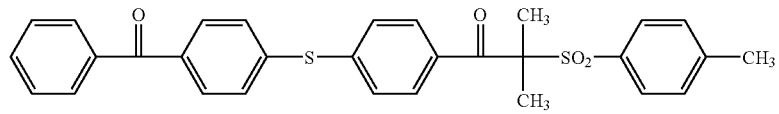

It is also possible to add cationic photoinitiators, such as aromatic sulfonium, phosphonium or iodonium salts, such as are described, for example, in U.S. Pat. No. 4,950,581, column 18, line 60 to column 19, line 10.

An example of an iodonium salt is (4-isobutyl-phenyl)-4-methylphenyl-iodonium hexafluorophosphate.

The photopolymerisable compositions comprise the photoinitiator advantageously in an amount from 0.05 to 15% by weight, preferably from 0.1 to 8% by weight, based on the composition.

The curable composition may be a liquid or a powder.

Preferred are powder coating compositions in which the unsaturated monomer or binder is a polyester, polyurethane, polyacrylate, an acrylate or methacylate-functionalised epoxy resin, an methacrylated polyester or an unsaturated carboxylic acid ester of an hydroxyalkylamide. One or more vinyl ester or vinyl ether compounds may further be added.

Binders as well can be added to these novel compositions, and this is particularly expedient when the photopolymerizable compounds are liquid or viscous substances. The quantity of binder may, for example, be 5-95%, preferably 10-90% and especially 40-90%, by weight relative to the overall solids content. The choice of binder is made depending on the field of application and on properties required for this field, such as the capacity for development in aqueous and organic solvent systems, adhesion to substrates and sensitivity to oxygen. Examples of suitable binders are polymers having a molecular weight of about 5'000 to 2'000'000, preferably 10'000 to 1'000'000. Examples are homo- and copolymers of acrylates and methacrylates, for example copolymers of methyl methacrylate/ethyl acrylate/methacrylic acid, poly(alkyl methacrylates), poly(alkyl acrylates); cellulose esters and cellulose ethers, such as cellulose acetate, cellulose acetobutyrate, methylcellulose, ethylcellulose; polyvinylbutyral, polyvinylformal, cyclized rubber, polyethers such as polyethylene oxide, polypropylene oxide and polytetrahydrofuran; polystyrene, polycarbonate, polyurethane, chlorinated polyolefins, polyvinyl chloride, vinyl chloride/vinylidene copolymers, copolymers of vinylidene chloride with acrylonitrile, methyl methacrylate and vinyl acetate, polyvinyl acetate, copoly(ethylene/vinyl acetate), polymers such as polycaprolactam and poly-(hexamethylenadipamide), and polyesters such as poly(ethylene glycol terephtalate) and poly(hexamethylene glycol succinate) and polyimides. case 22258

Further Additives

In addition the polymerisable mixtures may optionally comprise further conventional additives depending on the intended use.

Examples thereof are:

degassing agents antioxidants, optical brighteners, fillers, thermal inhibitors which are intended to prevent premature polymerisation, for example 2,2,6,6-tetramethyl hydroxy-piperidin-1-oxyl(4-hydroxy-TEMPO) and derivatives thereof;

antistatics, wetting agents or flow improvers and adhesion enhancers;

thermal drying or curing catalysts, for example organometallic compounds, amines or/and phosphines;

UV absorbers and light stabilisers, for example those from the group of the 2-2'-hydroxy-phenyl)-benzotriazoles, of the 2-hydroxybenzophenones, esters of unsubstituted or substituted benzoic acids, acrylates, sterically hindered amines, oxalic acid diamides, 2-(2-hydroxy-phenyl)-1,3,5-triazines, phosphites and phosphonites.

Examples of antioxidants, light stabilisers, UV absorbers or optical brighteners are: ®IRGANOX 1035, 1010, 1076, 1222, ®TINUVIN P, 234, 320, 326, 327, 328, 329, 213, 292, 144, 400, 622LD (commercially available from Ciba Specialty Chemicals), ®ANTIGENE P, 3C, FR, GA-80, ®SUMISORB TM-061 (commercially available from Sumitomo Chemical Industries Co.), ®SEESORB 102, 103, 501, 202, 712, 704 (commercially available from Sypro Chemical Co., Ltd.), ®SANOL LS770 (commercially available from Sankyo Co. Ltd.) ®UVITEX OB, commercially available from Ciba Specialty Chemicals.

Especially advantageous are additions of combinations of sterically hindered piperidine derivatives (HALS) and sterically hindered phenols, for example additions of IRGANOX 1035 and TINUVIN 292, for example in the ratio 1:1 see U.S. Pat. No. 4,923,915.

Photopolymerisation can also be accelerated by addition of photosensitisers that shift or broaden the spectral sensitivity. These include especially aromatic carbonyl compounds, for example benzophenone, thioxanthone, including especially isopropylthioxanthone, anthraquinone and 3-acylcoumarin derivatives, terphenyls, styryl ketones, and 3-(aroyl methylene)-thiazolines, camphorquinone and also eosin, rhodamine and erythrosine dyes.

The formulations may also comprise dyes and/or white or coloured pigments. Depending on the intended use, both inorganic and organic pigments may be used.

The above additives described above are conventional in the art and accordingly are used in the amounts customary in the art.

It is also possible to add solvents or water to the compositions used in the process according to the invention. Suitable solvents are solvents which are known to the person skilled in the art and are conventional especially in coating technology. Radiation-curable aqueous prepolymer dispersions are obtainable commercially in many variations. They are to be understood as being a dispersion of water and at least one prepolymer dispersed therein.

Preparation of the Coating

The components of the formulation and optionally further additives are applied uniformly to a substrate by means of known coating techniques, for example by spin-coating, immersion, knife coating, curtain pouring, brush application or spraying, especially by electrostatic spraying and reverse-roll coating, and also by electrophoretic deposition. The quantity applied (coat thickness) and the nature of the substrate (layer support) are dependent on the desired field of application. The range of oat thicknesses generally comprises values from 0.1 µm to more than 300 µm.

Substrates

Suitable are substrates of all kinds, e.g. wood, textiles, paper, ceramics, glass, glass fibres, plastics such as polyester, polyethylene terephthalate, polyolefins or cellulose acetate, especially in the form of films, and also for metals such as Al, Cu, Ni, Fe, Zn, Mg or Co and GaAs, Si or $SiO_2$, to which there is to be applied a protective layer or an Image by image-wise exposure.

Applications:

Liquid coatings or powder coatings or gelcoats. The coatings are preferably pigmented. It has been found that pigmented coatings, especially those containing opaque pigments (yellow, red) can be through cured using hydroxylamine esters.

Also possible is the use in printing inks.

Test Results:

Comparing the inventive dual cure system with a system as disclosed in U.S. Pat. No. 5,922,473 using peroxides as thermal initiators it can be shown that the glass transition temperature is lower in powders containing peroxides. Nevertheless reasonable through curing rates can be achieved.

Furthermore, it has been found that NIR-curing of a liquid coating composition or a powder coating composition results in a performance improvement such as adhesion, light fastness or through curing.

Thus, the invention further relates to process for improving performance of a coated substrate by applying to the substrate a coating composition whereby the coating composition is a blend of at least an ethylenically unsaturated compound and a hydroxylamine ester as defined above; followed by moving the coated substrate through an irradiation tunnel fitted with a combination of NIR and UV radiation emitters.

The invention further relates to a process for dual curing a liquid coating composition which process comprises
- a) applying a coating composition onto a substrate, whereby the coating composition is a blend of at least an ethylenically unsaturated resin and a hydroxylamine esters as defined above and a photoinitiator as defined above;
- b) moving the coated substrate through an irradiation tunnel fitted with one or more IR- or NIR radiation emitters and one or more UV-radiation emitters.

The invention further relates to a process for dual curing a powder coating composition comprises
- a) applying a powder coating composition onto a substrate whereby the powder coating composition is a blend of at least an ethylenically unsaturated compound and a hydroxylamine ester as defined above and a photoinitiator as defined above;
- b) applying just enough heat to said coating to melt and flow out said coating into a smooth molten film
- a) c) moving the coated substrate through an irradiation tunnel fitted with one or more IR- or NIR radiation emitters and one or more UV-radiation emitters.

The following Examples further illustrate the invention:

EXAMPLE 1

Thermal Curing with Hydroxylaminesters by High Intensity NIR Emitters

Hydroxylaminesters used:

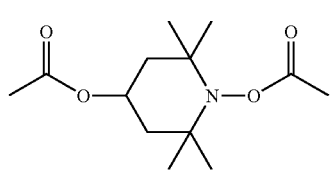

A

-continued

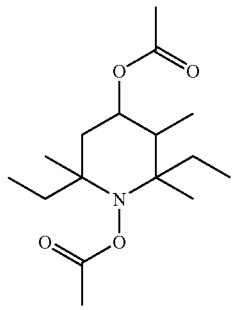

B

Acrylate formulation:

89 wt % Ebecryl 604 (75% epoxyacrylate in hexandioldiacrylate, UCB)

10 wt % Sartomer SR 344 (polyethyleneglycol 400 diacrylate, Cray Valley)

1 wt % Ebecyl 350 (silicondiacrylate, UCB)

1 or 5 wt % Hydroxylamine ester

Unsaturated polyester/styrene formulation 99.5 wt % Roskydal 502 (66% UPES in styrene, Bayer)

0.5 wt % Byk 300 (silicon resin, Byk-Mallinckrodt)

1 or 5% Hydroxylamine ester

The test formulations were applied onto the surface of 500 μm aluminium panels using a 60 μm wound wire bar.

The coated aluminium panel is cured in a TRIAB exposure unit (available from Thermal Innovations Corporation). The oven was fitted with an NIR module from Advanced Photonics (Adphos) AG Germany. Intensity 64A. The NIR lamps were set at a distance of 30 mm above the coated panels.

Cure speed was determined as the maximum belt speed under which dry rub resistance was observed (checked manually).

| Acrylate Formulation: | |
| --- | --- |
| Hydroxylamine ester, wt % | Cure speed (m/min) |
| A, 1% | 2 |
| A, 5% | 2 |
| B, 1% | 2 |
| B, 5% | 2 |

| UPES/styrene Formulation: | |
| --- | --- |
| Hydroxylamine ester, wt % | Cure speed (m/min) |
| A, 1% | 3 |
| A, 5% | 4 |
| B, 1% | 4 |
| B, 5% | 4 |

Acrylate double bond conversion:

The Acrylate formulation was spun onto a 2" silicon wafer (20 μm thick films). The silicon wafers were used for selective acrylate double bond conversion measurements by transmission IR spectroscopy (RTIR equipment) providing complementary information on the overall degree of cure after NIR exposure.

| Acrylate formulation | | |
| --- | --- | --- |
| Hydroxyamine ester, wt % | Belt Speed (m/min) | Acrylate double bond conversion (%) by IR |
| B, 1% | 5 | 56 |
| B, 1% | 6 | 56 |
| B, 1% | 7 | 55 |
| B, 1% | 8 | 12 |

EXAMPLE 2

Powder Coating Formulatons

Formulation 1, Clear Coat 77.5 wt % Uracross P 3125, unsaturated polyester resin, DSM 20.0 wt % Uracross P 3307, vinyl ether urethane; DSM 1.0 wt % Resiflow PV5, flow agent, Worlée Chemie GmbH, Lauenburg, Germany 0.5 wt % Worlee Add 902, degassing agent, Worlée Chemie GmbH, Lauenburg, Germany Masterbatch without initiator 98 wt %

2.0 wt % thermal initiator of the formula

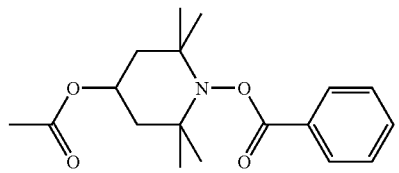

Formulation 2, Clear Coat 97.5 wt % Uvecoat 3000, methacrylated PES, UCB S.A., Drogenbos, Belgium 1.0 wt % Resiflow PV5, flow agent, Worlée Chemie GmbH, Lauenburg, Germany 0.5 wt % Worlee Add 902, degassing agent, Worlée Chemie GmbH, Lauenburg, Germany Masterbatch without intiator 98 wt %

2.0 wt % thermal initiator of the formula

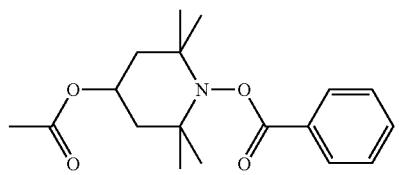

Formulation 3, Pigmented Coat 97.5 wt % Uvecoat 3000, methacrylated PES, UCB S.A., Drogenbos, Belgium 1.0 wt % Resiflow PV5, flow agent, Worlée Chemie GmbH, Lauenburg, Germany 0.5 wt % Worlee Add 902, degassing agent, Worlée Chemie GmbH, Lauenburg, Germany Masterbatch without initiator 96.5 wt %

1.5 wt % Spezialschwarz 250, Degussa 2.0 wt % thermal initiator of the formula

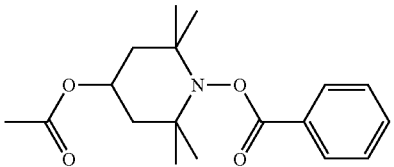

The above ingredients were mixed and subsequently homogenized in an extruder. The extrudates are rolled flat using a chill roll and hand crushed after cooling with a rolling pin, then milled on a Retsch ZM-1™ ultracentrifugal mill at 15000 rpm using a 0.5 mm milling sieve to give a powder, which is passed through a 125 μm sieve to give the final NIR/UV-curable powder coating composition.

The powder coating composition is applied to phosphated, cold-rolled steel panels from Advanced Coating Technologies using a Wagner Tribo-Star gun at a thickness of 70 μm. The coated panels are heated under two carbon-filament IR lamps until a surface temperature of 140° C. is reached and then cured in a TRIAB exposure unit under 6 Super Beem NIR lamps for 12 sec at 300° C. The power of the NIR lamps is 4.4 kW switched to 80%. The conveyer speed is 3 m/min in case of clear coatings and 20 m/min in case of the pigmented one. The NIR curing is optionally followed by UV curing using a HG lamp (80W/cm) whereas the power is switched from 60%, 80% to 100%.

After the curing, the pendulum hardness according to König (DIN 53157) is determined. The higher the values of the pendulum hardness measurement, the more durable and harder is the cured surface.

The gloss & haze value is measured gloss in accordance to ISO 2813 (ASTM D 523) at observing angle of 20′.

The results can be found in Table 1

TABLE 1

| Formulation | Curing | Gloss & Haze | pendulum hardness |
|---|---|---|---|
| 1 | NIR 80%, | 71 & 181 | 63 |
| 2 | NIR 80% | 82 & 168 | 192 |
| 3 | NIR 80% | 88 & 112 | 190 |

EXAMPLE 3

Glass transition temperature (Tg) in powder coatings containing hydroxylamine esters or peroxides.

TABLE 2

Formulation

| Components | Examples (amount in grams) | | | | |
|---|---|---|---|---|---|
| | 3.1 comparative | 3.2 | 3.3 | 3.4 | 3.5 |
| 1. Uvecoat ® 3000 | 326.5 | 326.5 | 326.5 | 326.5 | 326.5 |
| 2. Resiflow PV 5 ® | 5.0 | 5.0 | 5.0 | 5.0 | 5.0 |
| 3. Ceridust ® 9615 | 2.5 | 2.5 | 2.5 | 2.5 | 2.5 |
| 4. Worlee ® Add 902 | 1.0 | 1.0 | 1.0 | 1.0 | 1.0 |
| 5. Irgazin ® Yellow 2093 | 45.0 | 45.0 | 45.0 | 45.0 | 45.0 |
| 6. Kronos ® 2160 | 30.0 | 30.0 | 30.0 | 30.0 | 30.0 |
| 7. Blanc Fixe F | 75.0 | 75.0 | 75.0 | 75.0 | 75.0 |
| 8. Irgacure ® 2959 | 7.5 | | | 7.5 | 7.5 |
| 9. Irgacure ® 819 | 7.5 | | | 7.5 | 7.5 |
| 10. (hydroxylamine ester structure) | | 15.0 | | 15.0 | |
| 11. Dicumylperoxide | | | 15.0 | | 15.0 |
| Total: | 500.0 | 500 | 500 | 500 | 500 |
| Glass transition Temp. ° C. | 42.9 | 44.4 | 39.0 | 39.8 | 34.1 |

[a]Uvecoat ® 3000 from UCB S. A., Drogenbos, Belgium
[b]Resiflow ® PV 5 from from Worlée Chemie, Germany
[c]Ceridust ® 9615 from Clariant AG, Muttenz, Switzerland
[d]Worlée ® ADD 902 from Worlée Chemie, Germany
[e]Irgazin ® Yellow 2093 from Ciba Specialty Chemicals, Basel, Switzerland
[f]Kronos ® 2160 from Kronos, Germany
[g]Blanc Fixe F from Sachtleben, Germany
[h]Irgacure ® 2959 (2-Hydroxy-1-[4-(2-hydroxyethoxy)phenyl]-2-methyl-1-propanone) from Ciba Specialty Chemicals, Basel, Switzerland
[i]Irgacure ® 819 (Phenylbis(2,4,6-trimethylbenzoyl)-phosphine oxide) from Ciba Specialty Chemicals, Basel, Switzerland The glass transition temperature is determined by DSC (differential scanning calorimetry).

The results show that dicumylperoxide has a decreasing effect on the glass transition temperature of the coating. Thus problems of lumping and aggregate formation might occur during storage of the powder coating.

EXAMPLE 4

Dual curing of a yellow-pigmented UV powder coating in combination with hydroxyaminesters.

TABLE 3

Formulation

| Components | Examples (amount in grams) | | | | |
|---|---|---|---|---|---|
| | 4.1 comparative | 4.2 | 4.3 | 4.4 | 4.5 |
| 1. Uvecoat ® 3000[a] | 326.5 | 326.5 | 326.5 | 326.5 | 326.5 |
| 2. Resiflow PV 5 ®[b] | 5.0 | 5.0 | 5.0 | 5.0 | 5.0 |
| 3. Ceridust ® 9615[c] | 2.5 | 2.5 | 2.5 | 2.5 | 2.5 |
| 4. Worlee ® Add 902[d] | 1.0 | 1.0 | 1.0 | 1.0 | 1.0 |
| 5. Irgazin ® Yellow 2093[e] | 45.0 | 45.0 | 45.0 | 45.0 | 45.0 |
| 6. Kronos ® 2160[f] | 30.0 | 30.0 | 30.0 | 30.0 | 30.0 |
| 7. Blanc Fixe F[g] | 75.0 | 75.0 | 75.0 | 75.0 | 75.0 |
| 8. Irgacure ® 2959[h] | 7.5 | | | 7.5 | 7.5 |
| 9. Irgacure ® 819[i] | 7.5 | | | 7.5 | 7.5 |
| 10. | | 15.0 | | 15.0 | |
| 11. Dicumylperoxide | | | 15.0 | | 15.0 |
| Total: | 500 | 500 | 500 | 500 | 500 |

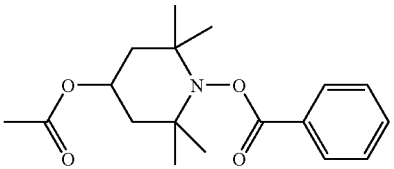

The components are mixed using a Prism Pilot 3 for 30 s at 2000 rpm. The mixture is then extruded on a prism extruder at 300 revolutions/minute at 80° C. and is rolled out. The powder coating composition is coarsely comminuted using a bench cutter and is grounded in a Retsch ZM-1 ultra centrifugal mill with a 0.5 mm annular-perforation screen at 15,000 rpm. Finally, the powder is passed through a 125 μm sieve on a centrifugal sieving machine Siftomill L400-1 having an average particle size of from 30 to 50 μm.

The finished powder coating composition is sprayed electrostatically to a coat thickness of 70 to 90 μm onto white coil coated aluminium panels using an ESB-Wagner corona cup gun at 60 kV. The coated panels are melted in an electric oven at 180° C. for 10 minutes. The coated panels are heated under carbon-filament IR lamps until a surface temperature of 140° C. is reached and then cured in a TRIAB exposure unit under 6 Super Beem NIR lamps. The power of the NIR lamps is 4.4 kW switched depending on the system 65% to 80%. The conveyer speed is 3 m/min. The NIR curing is followed by UV curing using two HG lamp (80 W/cm) whereas the power is switched depending on the system 50% to 70%.

The following parameters are determined:

Aceton test: The solvent rub test is a quick test used for assessing the cure of powder coatings. A detailed test method can be found in "The Complete Finisher Handbook" published by the Powder Coating Institute (PCI). For UV powder coatings the rub test will help to evaluate the level of surface cure.

MEK test: The MEK-resistance is determined to evaluate the level of through cure. For that purpose after the cure when the panels are still hot the cured free films are removed from the tape. A free film of a size of 5×2 cm is weighed and the film thickness is noted. The free film is then soaked in MEK for 10 minutes. After drying the free film for 10 minutes at room temperature it is dried 5 minutes at 80° C. The free film is weighed afterwards and the weight lost in % is determined. The minor the weight loss the higher the through cure of the coatings Visual test according DIN 53230

TABLE 4

| | Aceton test | MEK test | visual |
|---|---|---|---|
| (Irg2953/Irg819) | | | |
| UV 50% 3 m/min | 32 | 80% | o.k. |
| Irg2959/Irg819+ 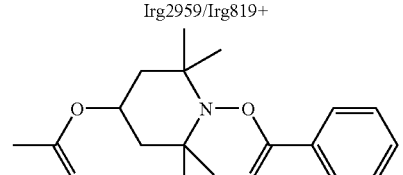 (UV 65%; NIR 85% 13 cm) 3 m/min | 40 | 54% | o.k. |

The results show that through curing has been increased in the dual cure process from 20% to about 50%

EXAMPLE 5

Improvement of the adhesion in dual curing systems using thermal curing with hydroxylamine esters by high intensity NIR emitters.

Pigmented Polyester-Acrylate formulation (premix)

60.0 wt % Ebecryl 830 (polyester acrylate, UCB)

15.0 wt % h HDDA (1,6 hexanediol diacrylate; diluent)

15.0 wt % TMPTA (trimethylolpropane triacrylate, diluent)

2.8 wt % EFKA®4050 (polyurethane dispersant; EFKA)

10 wt % Pallotol® Yellow 2140 HD (Pigment; BASF)

The premix is dispersed in a pearlmill. 2.0 wt % of hydroxylamine ester and 3 wt % of photoinitiator are added.

Application with slit coater WFT 90 μm on cog coated panels (aluminum).

UV-Curing conditions: Line speed 3 m/min, 2 Hg-bulbs at 70% output (approx. 80 W/cm) NIR-Curing conditions: NIR-Lamps (Adphos) 4.4 kW switched to 80%, belt speed 3 m/min, distance lamp-substrate 3 cm.

The NIR curing is followed by UV curing.

The dry film properties such as adhesion and dry film thickness (DFT) were evaluated.

DFT Measurement

Dry film thickness was measured, using a thickness gauge working with magnetic-inductive method (results given in [μm]).

Cross hatch adhesion test (1 mm). (ASTM D3359);

The angle of the two cuts of the cross hatch test were performed in 45°. Three categories of adhesion for the cross hatch test were set. CH1=full adhesion, CH2=partially loss of adhesion, CH3=complete delamination.

Adhesion results
Cross Hatch test: CH1 = no defect, CH = 2 medium defect, CH3 = strong defect (delamination)

| Thermal Initiator | Photoinitiator | DFT | Cross Hatch |
|---|---|---|---|
| 2% (structure) | 3% Irgacure 2020 | 18 | 1 |
| 2% (structure) | 3% Irgacure 2020 | 21 | 1 |
| 2% Dicumylperoxid | 3% Irgacure 2020 | 27 | 2 |
| 2% Vazo 88 | 3% Irgacure 2020 | 27 | 3 |

Irgacure ® 2020 (20% Irgacure 819 + 80% Darocur 1173), available from Ciba

The results show improved adhesion when using the dual curing composition according to the invention.

EXAMPLE 6

Improvement of the light stability using thermal curing with hydroxylamine esters by high intensity NIR emitters.

Unsaturated polyester/styrene formulation 99.5 wt % Roskydal 502 (66% UPES in styrene, Bayer)

0.5 wt % Byk 300 (silicon resin, Byk-Mallinckrodt)

2.0 wt % 96 Hydroxylamine ester

Pigmented unsaturated polyester/styrene formulation:

54.7 wt % A Roskydal 502 (66% UPES in styrene, Bayer)

0.27 wt % Byk 300 (silicon resin, Byk-Mallinckrodt)

45.0 wt % Kronos® 2130

1.6 wt % EFKA®4050

15.0 wt % Butyl acetate

Pigmented epoxy-acrylate formulation 48.9 wt % Ebecryl 604 (75% epoxyacrylate in hexandioldiacrylate, UCB)

5.5 wt % Sartomer SR 344 (polyethyleneglycol 400 diacrylate, Cray Valley)

0.5 wt % Ebecryl 350 (silicondiacrylate, UCB)

2.0 wt % Hydroxylamine ester 45.0 wt % Kronos®2130

1.6 wt % EFKA®4050

15.0 wt % Butyl acetate

Curing Conditions

For all systems: NIR-Lamps (Adphos) at 85%, belt speed 3 m/min, distance lamp-substrate 3 cm Weathering Conditions Accelerated light fastness test DIN/ISO/EN 11341 (CAM 0)

Our conditions for the test DIN/ISO/EN 11341/C (CAM 0) are as follows:

Machine type: Atlas Weather-Ometer Ci-65 A (two-tier rack)

Light Source: 6.5 kW Xenon burner water-cooled

Filter combination: Outer filter "Sodalime" (Window glass) Inner filter Boro S

Cycle conditions: Permanent Light

Colour-measurement and colour differences were measured and calculated using the CIE-Lab Formula. The table below shows the colour change as ΔE* (DE) after 500 h of accelerated weathering.

Weathering Results

| (structure 1) | (structure 2) | Dicumylperoxid |
|---|---|---|
| UEPS Clear | | |
| 0.8 DE | 0.9 DE | 2.5 DE |
| EP White | | |
| 0.5 DE | 0.9 DE | 1.5 DE |
| UEPS White | | |
| 0.6 DE | 0.8 DE | 1.1 DE |

The invention claimed is:

1. A dual thermal and ultraviolet radiation curable coating composition, comprising
   a) at least an ethylenically unsaturated compound;
   b) a thermal initiator effective to enable IR-curing or NIR-curing of the ethylenically unsaturated compound;

c) a photoinitiator effective to enable UV-curing of the ethylenically unsaturated compound;

wherein the thermal initiator is a hydroxylamine ester which has a structural element of formula (I) or formula (I') or a polymeric hydroxylamine ester which has a repetitive structural unit of formula (II) or (II')

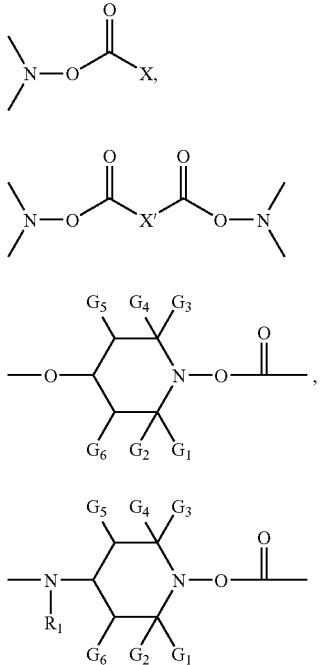

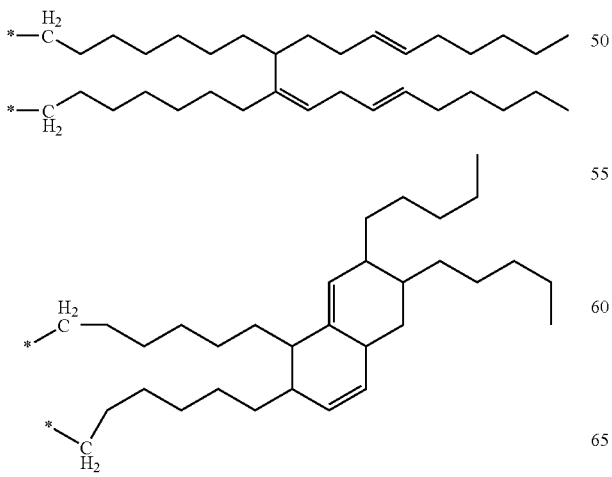

wherein

X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylen, $C_1$-$C_{36}$, $C_1$-$C_{36}$alkinylene, —($C_1$-$C_6$alkylene)-phenyl-($C_1$-$C_6$alkylene) or a group

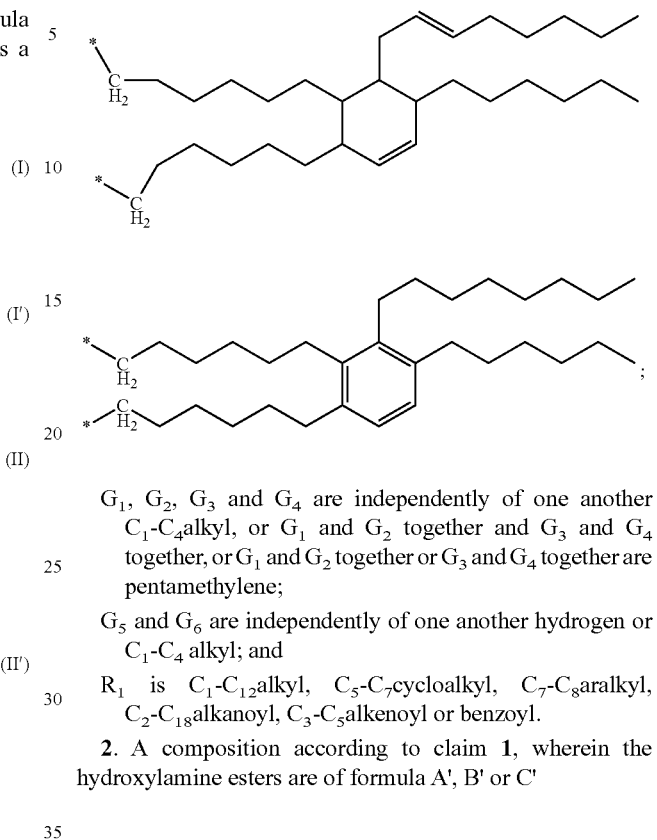

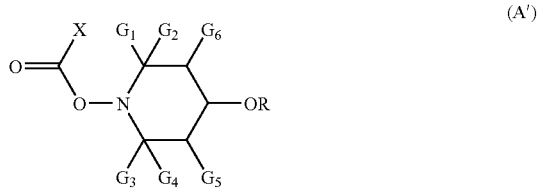

$G_1$, $G_2$, $G_3$ and $G_4$ are independently of one another $C_1$-$C_4$alkyl, or $G_1$ and $G_2$ together and $G_3$ and $G_4$ together, or $G_1$ and $G_2$ together or $G_3$ and $G_4$ together are pentamethylene;

$G_5$ and $G_6$ are independently of one another hydrogen or $C_1$-$C_4$ alkyl; and $R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl.

2. A composition according to claim 1, wherein the hydroxylamine esters are of formula A', B' or C'

(A')

wherein

X is hydrogen, $C_1$-$C_{36}$alkyl or $C_6$-$C_{10}$aryl;

$G_1$, $G_2$, $G_3$ and $G_4$ are methyl or $G_1$ and $G_3$ are methyl and $G_2$ and $G_4$ are ethyl or $G_1$ and $G_2$ are methyl and $G_3$ and $G_4$ are ethyl;

$G_5$ and $G_6$ are independently hydrogen or methyl;

R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, wherein each carboxylic acid can be substituted in the aliphatic, cycloaliphatic or aromatic moiety by 1 to 3 —COO$Z_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

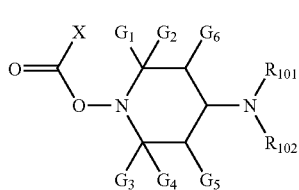 (B')

wherein X and $G_1$ to $G_6$ are as defined above;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, a carbonyl or a carbamide group, or is glycidyl, a group of the formula —$CH_2CH(OH)$—Z or of the formula —CO—Z— or —CONH—Z wherein Z is hydrogen, methyl or phenyl;

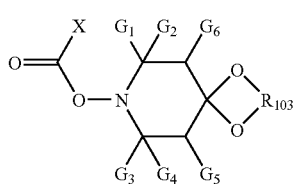 (C')

$R_{103}$ is $C_2$-$C_8$ or hydroxy or $C_4$-$C_{32}$acyloxy.

3. A composition according to claim 2, wherein the hydroxylamine esters are of formula A'.

4. A composition according to claim 1, wherein the photo-initiator is selected from benzophenones and siloxane modified benzophenones; benzoins and siloxane modified benzoins; alpha-hydroxyketones, alpha-alkoxyketones or alpha aminoketones and siloxane modified derivatives thereof; acylphosphine oxides; titanocenes; phenylglyoxalates and siloxane modified derivatives thereof.

5. A composition according to claim 2, wherein the photo-initiator is selected from benzophenones and siloxane modified benzophenones; benzoins and siloxane modified benzoins; alpha-hydroxyketones, alpha-alkoxyketones or alpha aminoketones and siloxane modified derivatives thereof; acylphosphine oxides; titanocenes; phenylglyoxalates and siloxane modified derivatives thereof.

6. A composition according to claim 3, wherein the photo-initiator is selected from benzophenones and siloxane modified benzophenones; benzoins and siloxane modified benzoins; alpha-hydroxyketones, alpha-alkoxyketones or alpha aminoketones and siloxane modified derivatives thereof; acylphosphine oxides; titanocenes; phenylglyoxalates and siloxane modified derivatives thereof.

7. A process for dual curing a liquid coating composition which process comprises
i) applying a coating composition onto a substrate, where said coating composition comprises
a) at least an ethylenically unsaturated compound;
b) a hydroxylamine ester thermal initiator which has a structural element of formulae (I) or (I') or a polymeric hydroxylamine ester which has a repetitive structural unit of formula (II) or (II')

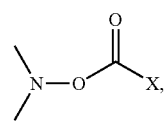 (I)

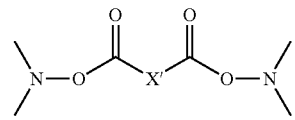 (I')

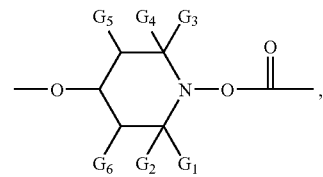 (II)

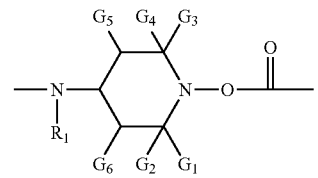 (II')

wherein

X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylen, $C_1$-$C_{36}$, $C_1$-$C_{36}$alkinylene, —($C_1$-$C_6$alkylene)-phenyl-($C_1$-$C_6$alkylene) or a group

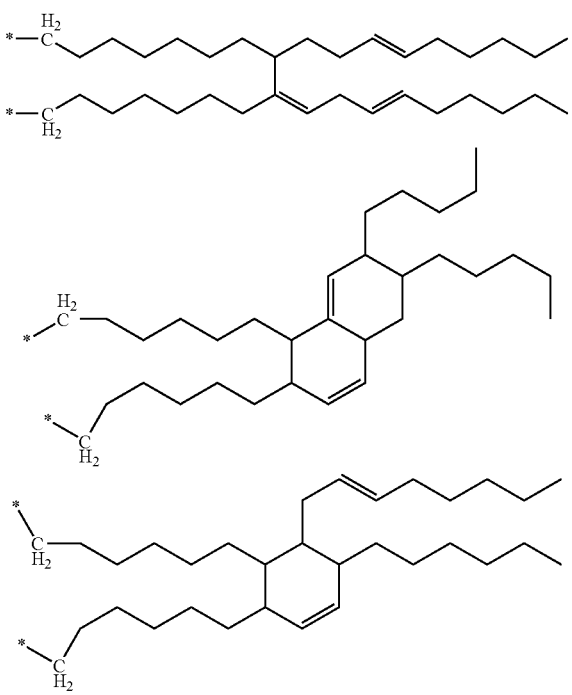

-continued

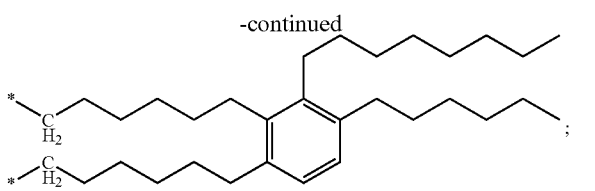

G₁, G₂, G₃ and G₄ are independently of one another C₁-C₄alkyl, or G₁ and G₂ together and G₃ and G₄ together, or G₁ and G₂ together or G₃ and G₄ together are pentamethylene;

G₅ and G₆ are independently of one another hydrogen or C₁-C₄ alkyl;

R₁ is C₁-C₁₂alkyl, C₅-C₇cycloalkyl, C₇-C₅aralkyl, C₂-C₁₈alkanoyl, C₃-C₅alkenoyl or benzoyl; and c) a photoinitiator selected from benzophenones and siloxane modified benzophenones; benzoins and siloxane modified benzoins; alpha-hydroxyketones, alpha-alkoxyketones or alpha aminoketones and siloxane modified derivatives thereof; acylphosphine oxides; titanocenes; phenylglyoxalates and siloxane modified derivatives thereof;

and ii) moving the coated substrate through an irradiation tunnel fitted with one or more IR- or NIR radiation emitters and one or more UV-radiation emitters.

8. A process according to claim 7, wherein the hydroxylamine esters are of formula A', B' or C'

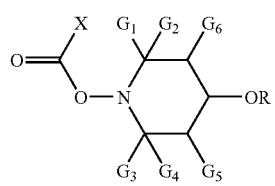

(A')

wherein

X is hydrogen, C₁-C₃₆alkyl or C₆-C₁₀aryl;

G₁, G₂, G₃ and G₄ are methyl or G₁ and G₃ are methyl and G₂ and G₄ are ethyl or G₁ and G₂ are methyl and G₃ and G₄ are ethyl;

G₅ and G₆ are independently hydrogen or methyl;

R is hydrogen, C₁-C₁₈alkyl which is uninterrupted or C₂-C₁₈alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, wherein each carboxylic acid can be substituted in the aliphatic, cycloaliphatic or aromatic moiety by 1 to 3 —COOZ₁₂ groups, in which Z₁₂ is H, C₁-C₂₀alkyl, C₃-C₁₂alkenyl, C₅-C₇cycloalkyl, phenyl or benzyl; or R is a monovalent radical of a carbamic acid or phosphorus-containing acid or a monovalent silyl radical;

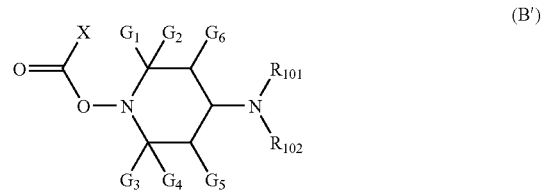

(B')

wherein X and G₁ to G₆ are as defined above;

R₁₀₁ is C₁-C₁₂alkyl, C₅-C₇cycloalkyl, C₇-C₈aralkyl, C₂-C₁₈alkanoyl, C₃-C₅alkenoyl or benzoyl;

R₁₀₂ is C₁-C₁₈alkyl, C₅-C₇cycloalkyl, C₂-C₈alkenyl unsubstituted or substituted by a cyano, a carbonyl or a carbamide group, or is glycidyl, a group of the formula —CH₂CH(OH)—Z or of the formula —CO—Z— or —CONH—Z wherein Z is hydrogen, methyl or phenyl;

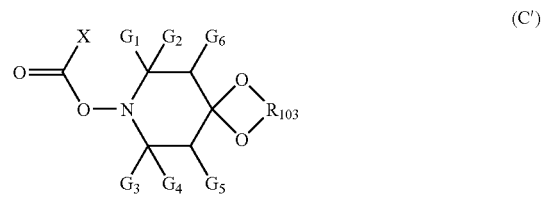

(C')

R₁₀₃ is C₂-C₈ or hydroxy or C₄-C₃₂acyloxy.

9. A process according to claim 8, wherein the hydroxylamine esters are of formula A'.

10. A process for dual curing a powder coating composition according to claim 7, wherein the coating composition of step i is a powder coating composition comprising the elements a, b and c and an additional step is performed between steps i and ii, wherein just enough heat is applied to said coating to melt and flow out said coating into a smooth molten film.

11. A process for dual curing a powder coating composition according to claim 8, wherein the coating composition of step i is a powder coating composition comprising the elements a, b and c and an additional step is performed between steps i and ii, wherein just enough heat is applied to said coating to melt and flow out said coating into a smooth molten film.

12. A process for dual curing a powder coating composition according to claim 9, wherein the coating composition of step i is a powder coating composition comprising the elements a, b and c and an additional step is performed between steps i and ii, wherein just enough heat is applied to said coating to melt and flow out said coating into a smooth molten film.

13. A coated substrate with improved performance obtained by the method of claim 7.

14. A coated substrate with improved performance obtained by the method of claim 10.

* * * * *